(12) United States Patent
Gerdes

(10) Patent No.: US 6,511,137 B2
(45) Date of Patent: Jan. 28, 2003

(54) METHOD AND APPARATUS FOR CALCULATING ACTUATION CONTROL OF AN FDR/ESP HYDRO-SUBASSEMBLY FOR REDUCTION OF HYDRAULIC NOISES

(75) Inventor: Manfred Gerdes, Oberrixingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/893,771

(22) Filed: Jun. 28, 2001

(65) Prior Publication Data
US 2002/0024253 A1 Feb. 28, 2002

(30) Foreign Application Priority Data
Jul. 1, 2000 (EP) .......................................... 00 113 991

(51) Int. Cl.⁷ ................................................ B60T 8/66
(52) U.S. Cl. ..................... 303/156; 303/153; 303/119.1
(58) Field of Search ................................ 303/153, 156, 303/119.1, 119.2, 22.1, 22.2, 41, 50, DIG. 8, 3, 157, 158, 161, 162, 116.1, 117.1, 20

(56) References Cited

U.S. PATENT DOCUMENTS

| | | | | |
|---|---|---|---|---|
| 5,188,433 A | * | 2/1993 | Reinartz et al. | 303/113.1 |
| 5,522,422 A | * | 6/1996 | Beck | 137/505.25 |
| 5,823,640 A | * | 10/1998 | Eichhorn et al. | 137/14 |
| 5,848,827 A | * | 12/1998 | Levrai | 188/356 |
| 5,948,431 A | * | 9/1999 | Lavery | 424/438 |
| 5,971,501 A | * | 10/1999 | Hosoya | 303/119.2 |
| 6,003,958 A | * | 12/1999 | Volz et al. | 303/116.1 |
| 6,007,163 A | * | 12/1999 | Sawada | 303/116.2 |
| 6,086,164 A | * | 7/2000 | Oehler et al. | 303/113.1 |
| 6,224,170 B1 | * | 5/2001 | Hosoya | 251/129.15 |
| 6,234,588 B1 | * | 5/2001 | Sawada | 303/113.1 |
| 6,347,844 B1 | * | 2/2002 | Hosoya et al. | 303/119.2 |

\* cited by examiner

Primary Examiner—Christopher P. Schwartz
Assistant Examiner—Devon Kramer
(74) Attorney, Agent, or Firm—Kenyon & Kenyon

(57) ABSTRACT

A method and apparatus for calculating the actuation control of a hydraulic sub-system of a braking system in order to reduce noises associated with the hydraulics is presented. Input signals and measured/determined characteristics are utilized to calculate a value of a drive time for an inlet valve, a value of a pulse width modulator output, a duration of a current signal reduction time and a pulse width modulator value associated with the current signal reduction time, all of which determine actuation control of the hydraulic sub-system.

26 Claims, 20 Drawing Sheets

METHOD AND APPARATUS FOR CALCULATING ACTUATION CONTROL OF AN FDR/ESP HYDRO-SUBASSEMBLY FOR REDUCTION OF HYDRAULIC NOISES

The invention relates to a method and apparatus for calculating the actuation control of the hydraulic sub-system of a braking system in order to reduce noises associated with the hydraulics.

The hydraulics of a brake system consists of a number of pumps and valves assigned to each wheel of an automobile, all of which are controlled by a brake circuit. Proper actuation of the pumps and valves controls braking strength and degree for stopping of the automobile. A priming pump and a return pump generate a braking pressure, controlled by the brake circuit through a return valve and a pilot valve. The pressure is translated to individual wheel brakes by means of a discharge valve and an admission valve.

Control of these hydraulics by the brake circuit is through electronic signaling on the basis of assigned and/or calculated values. Assignment and/or calculation of these values is dependent upon such things as the inherent pump and valve characteristics. Thus, even while the brake circuit controls the valves and pumps, the condition of the brake circuit itself can be determined as a function of the valves (i.e., whether opened or closed, and to what degree) and as a function of the pumps (i.e., whether the pump is pressurized or not).

As a function of the signaling by the brake circuit, actuation of the valves and pumps results in vibration and translation noises. For instance, a conventional drive control of a solenoid valve in an FDR or ABS brake system specifics a maximum current ($V_{batt}/R_{solenoid}$) or minimum current (0.07) signal, switched over in intervals of 1 millisecond. The associated pressure gradients in operation of the valves and pumps generate substantial noises during slip control. The equilibrium of pressure, spring and solenoid forces results in a partially open (or partially closed) solenoid valve (i.e., it is not fully open as it is for a minimum current signal nor fully closed as it is for a maximum current signal). Such partial opening/closing reduces the pressure gradients such that the hydraulic noises of the brake system are reduced. However, the drive control calculations must therefore be made relatively precisely.

Accordingly, a method and apparatus for a calculation of an actuation control of a hydraulic-subsystem in a braking system in order to further reduce noise is presented. In an FDR/ESP hydraulic subsystem, calculation of a valve drive-time required for a desired pressure build-up is determined as a function of the pre-compression and estimated pump pressure from the known behavior of the characteristic curve for pump pressure versus the displaced brake fluid volume. This indicates how long the valves responsible for the brake cylinder must be opened. Of particular interest here is only the positive valve drive time calculated for the inlet valve with which the pressure build-up is controlled.

To reduce the noise generation within the slip control, the inlet valve should not be opened fully, rather it is only opened to a definable percentage. For this purpose, a pulse-width modulated (PWM) voltage is output via a power output stage, which is used to configure a defined current signal level. This current signal level corresponds to the force equilibrium across the valve body. Furthermore, to achieve this equilibrium state with the smallest possible delay the PWM drive is switched over to driving a smaller PWM value for a defined time; this is done to reduce the solenoid valve current to the desired level as quickly and precisely as possible.

The present invention, including its features and advantages, will become more apparent from the following detailed description with reference to the accompanying drawings, wherein FIG. 1 illustrates a chart of an "ordinary" brake cylinder pressure increase with LMV-EV during an ABS-control cycle, according to an embodiment of the present invention.

FIGS. 4A, 4B, 4C, 4D, 4E, 4F, 4G, 4H, 4I, 4J, 4K, 4L, 4M, 4N, 4O, and 4P illustrate a flow diagram for reducing noise from the hydraulics of a brake system, according to an embodiment of the present invention.

Figure 5:
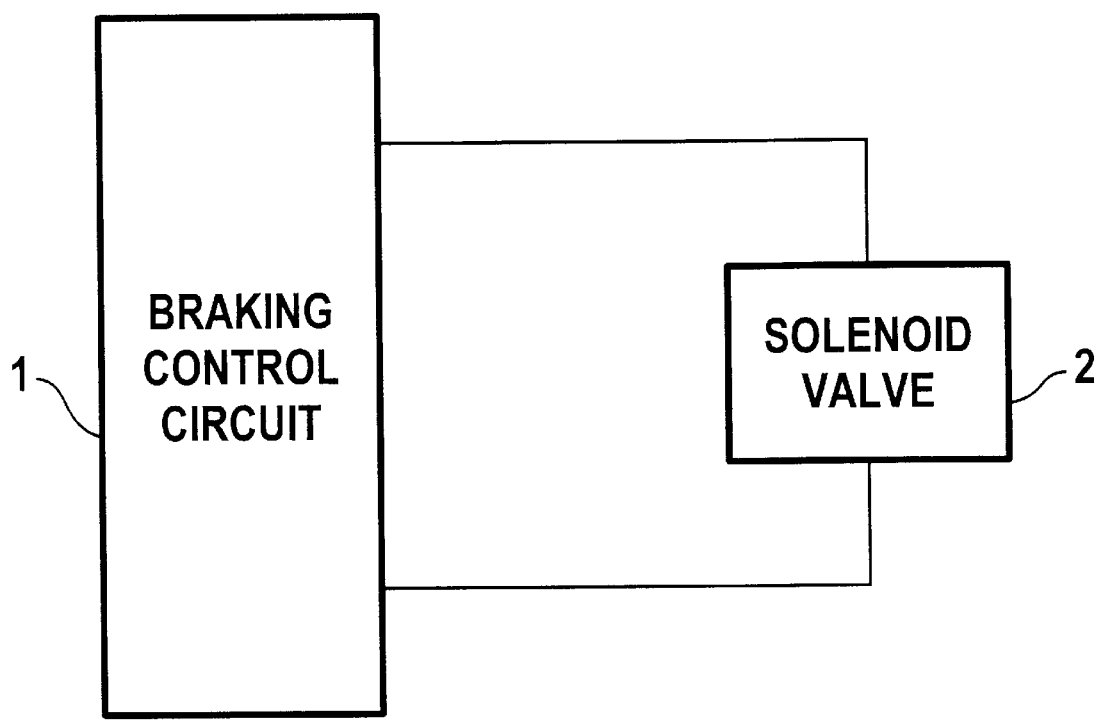

FIG. 5 illustrates a schematic of a braking control circuit, according to an embodiment of the present invention.

FIGS. 1 through 5 illustrate a method and apparatus for calculating a pulse width modulator value for output in an output stage, calculating a required drive time of an inlet valve of a brake cylinder, and determining a current reduction time signal and pulse width modulator value within the current reduction time signal.

Figure 1:
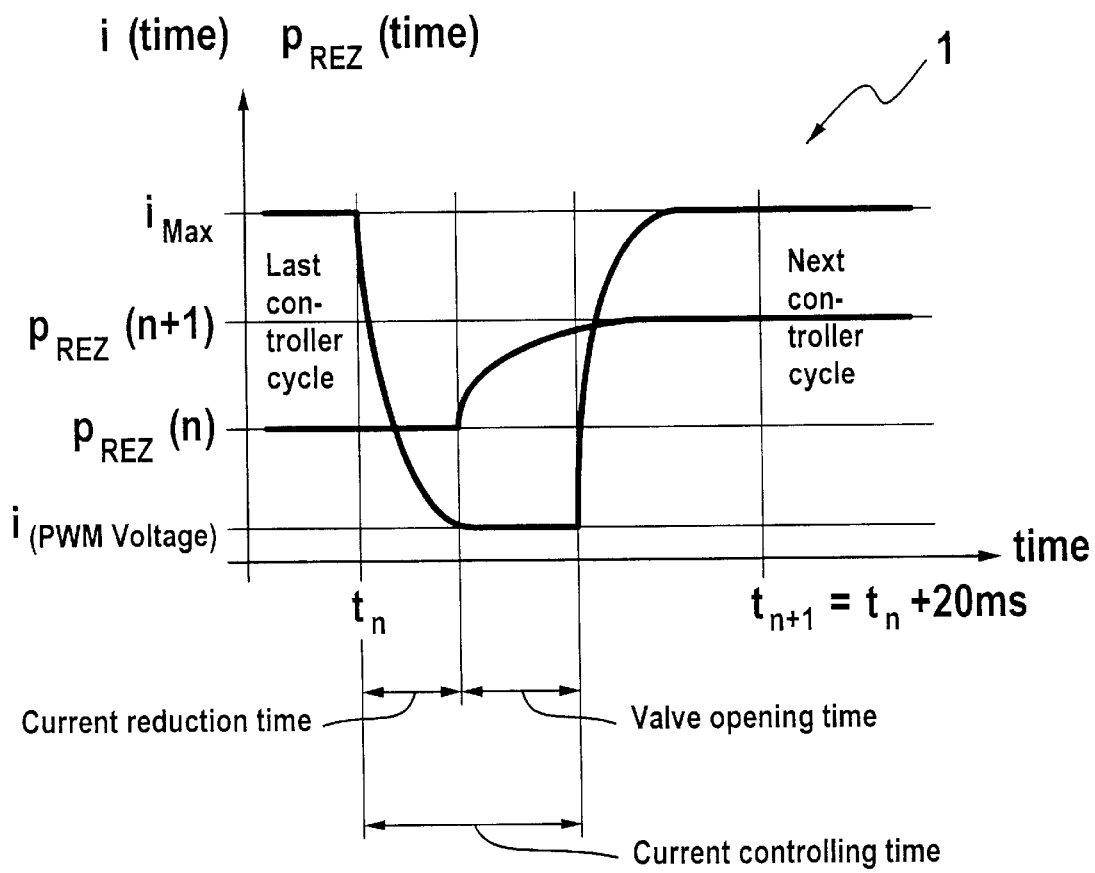
Figure 2:
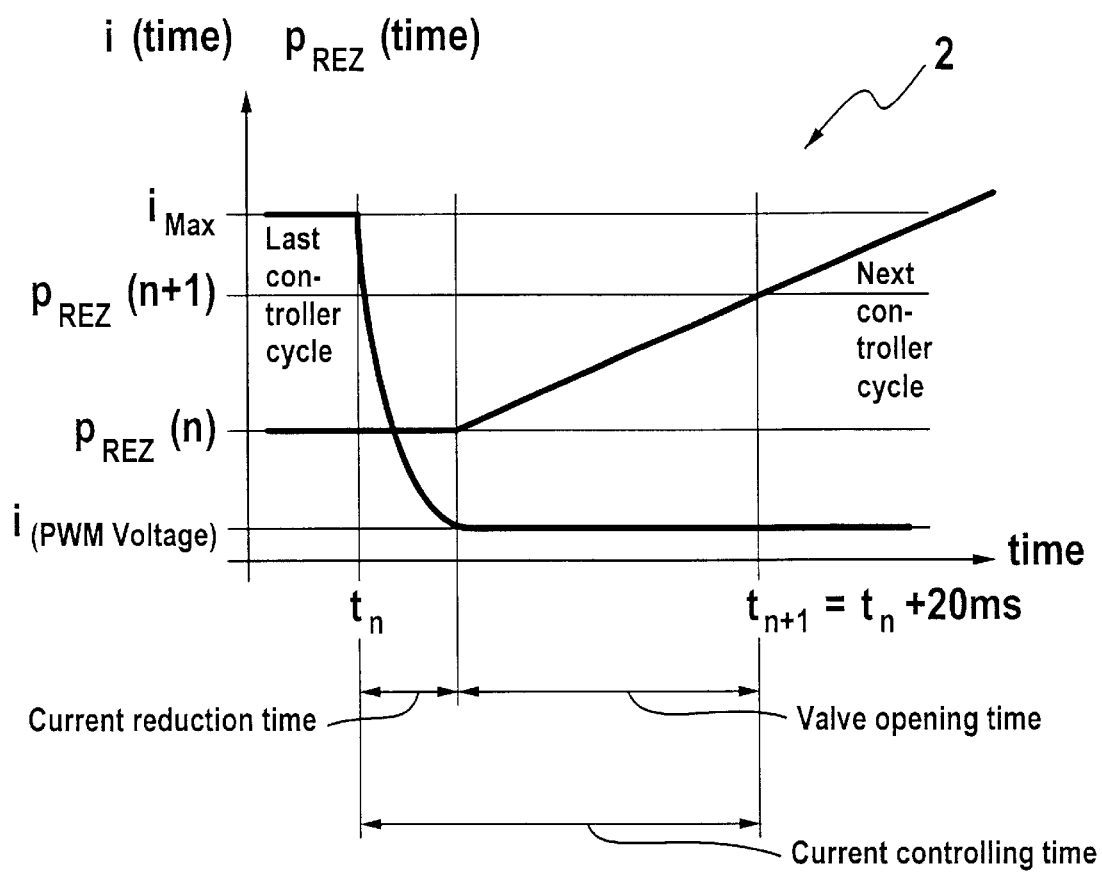
FIG. 2 illustrates a chart of a controller cycle where the valve controlling time is noticeably longer and the valve, at the end of the cycle, is still in an open position, according to an embodiment of the present invention.
Figure 3:
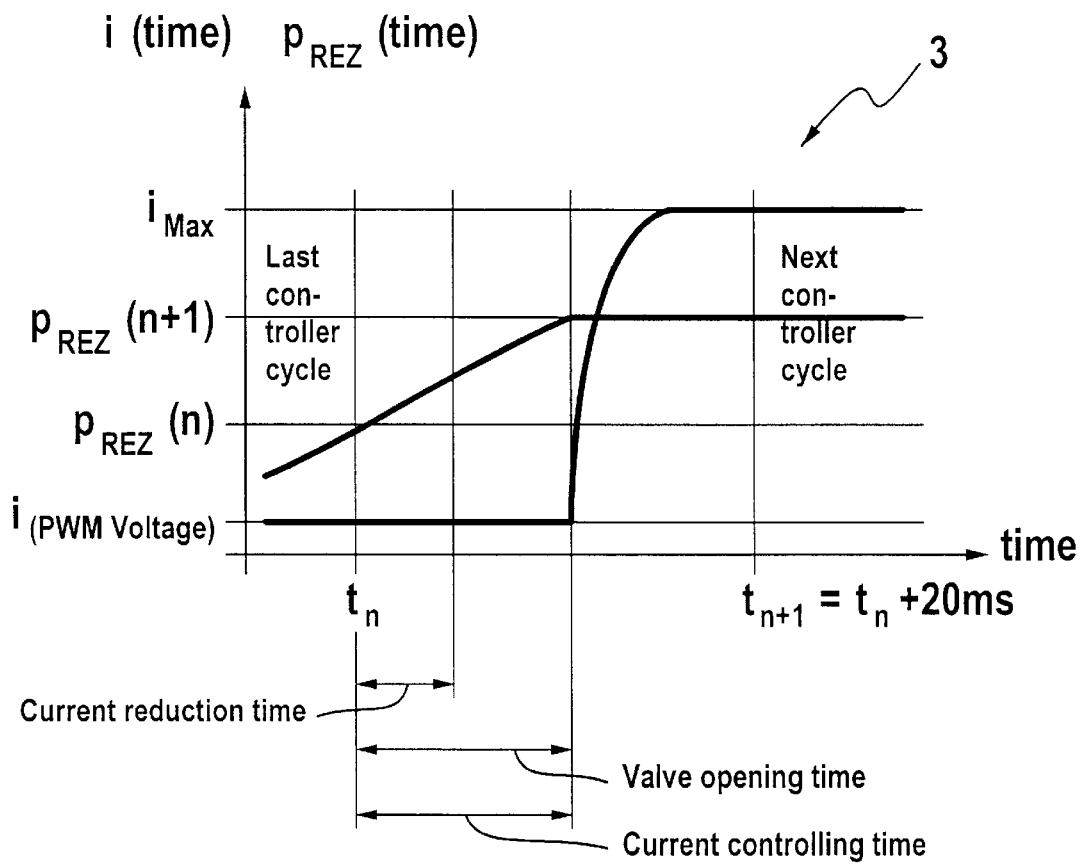
FIG. 3 illustrates a chart of a controller cycle, following the cycle illustrated in FIG. 2 where the valve couldn't close after the pressure increase, where the current is increased and the pressure gradient is controlled, according to an embodiment of the present invention.

Referring to FIGS. 1, 2 and 3, charts of differing controller cycles in which a pressure gradient of a wheel brake cylinder is increased/controlled are shown. In FIG. 1, a chart 1 of an "ordinary" pressure increase of the brake cylinder utilizing LMV-EV during ABS-control is shown. This is the case where only a little pressure increase in the brake cylinder is needed. In this controller cycle, the solenoid current i is reduced during the current reduction time starting at $t_n$ from a value of $i_{Max}$ to the current value given by the PWM Voltage (i.e., $i_{(PWM\ Voltage)}$). The current reduction requires several milliseconds, depending on the pressure difference across the valve. In the present invention, this current reduction time-value is called "stromab" for the linear approximated value and "deltaT" for the non-linear approximated value. At this point, the current should be constant for the valve opening time, a value called "toffen", while the wheel brake cylinder pressure is increased from $P_{REZ}(n)$ to $P_{REZ}(n+1)$. At the desired pressure increase, the current is increased back to $i_{Max}$. As the current controlling time of the valve is short enough, and the LMV is able to reduce the valve lift to reduce the pressure gradient, the pressure increase is effectually stretched.

In FIG. 2, however, a chart 2 of an alternative situation in which a greater brake cylinder pressure increase is needed and the valve controlling time is thus noticeably longer is shown. In this case the valve remains open at the end of the controller cycle, and as it is impossible to increase the current after the pressure increase during the present controller cycle, the controller must check for this occurrence in the next controller cycle. This is the case shown in chart 3 of FIG. 3. It should be noted, of course, that it is possible that the valve may be required to remain open (dependent upon brake cylinder pressure requirements) during more than one full controller cycle. Further, it is to be understood that another variation of the LMV-control is to reduce the current i down to zero in what is called an emulation of a normal EV-control. The controller must accordingly check for each of these cases and must then calculate the correct valve opening time. It is to be noted, of course, that each controller cycle is effectively 20 milliseconds, that is the time from $t_n$ to $t_{n+1}$ is 20 milliseconds.

Accordingly, referring now to FIGS. 4A, 4B, 4C, 4D, 4E, 4F, 4G, 4H, 4I, 4J, 4K, 4L, 4M, 4N, 4O, and 4P, calculation of actuation control of a hydraulic sub-system, according to a preferred embodiment, begins in steps 10, 15 and 20 with, respectively, setting a bit for the current i reduction time, setting a bit for the current i boost (current increase after pressure increase), as well as determining a variable "dpVent" which is the differential pressure across the valve (i.e., the driving force of the pressure increase). In an initial case, both of the bits (i.e., boolean variables SAZ_b and SAH_b) for the current reduction time and the current boost are set to TRUE (i.e., that is, a current reduction time and a current boost are both needed/allowed in the present controller cycle). Further, the variable "dpVent" equals the calculation of a measured signal for the initial driving pressure (i.e., pVor) minus that of the estimated pressure in the specific wheel brake cylinder to be controlled (i.e., pRad).

Figure 4A:
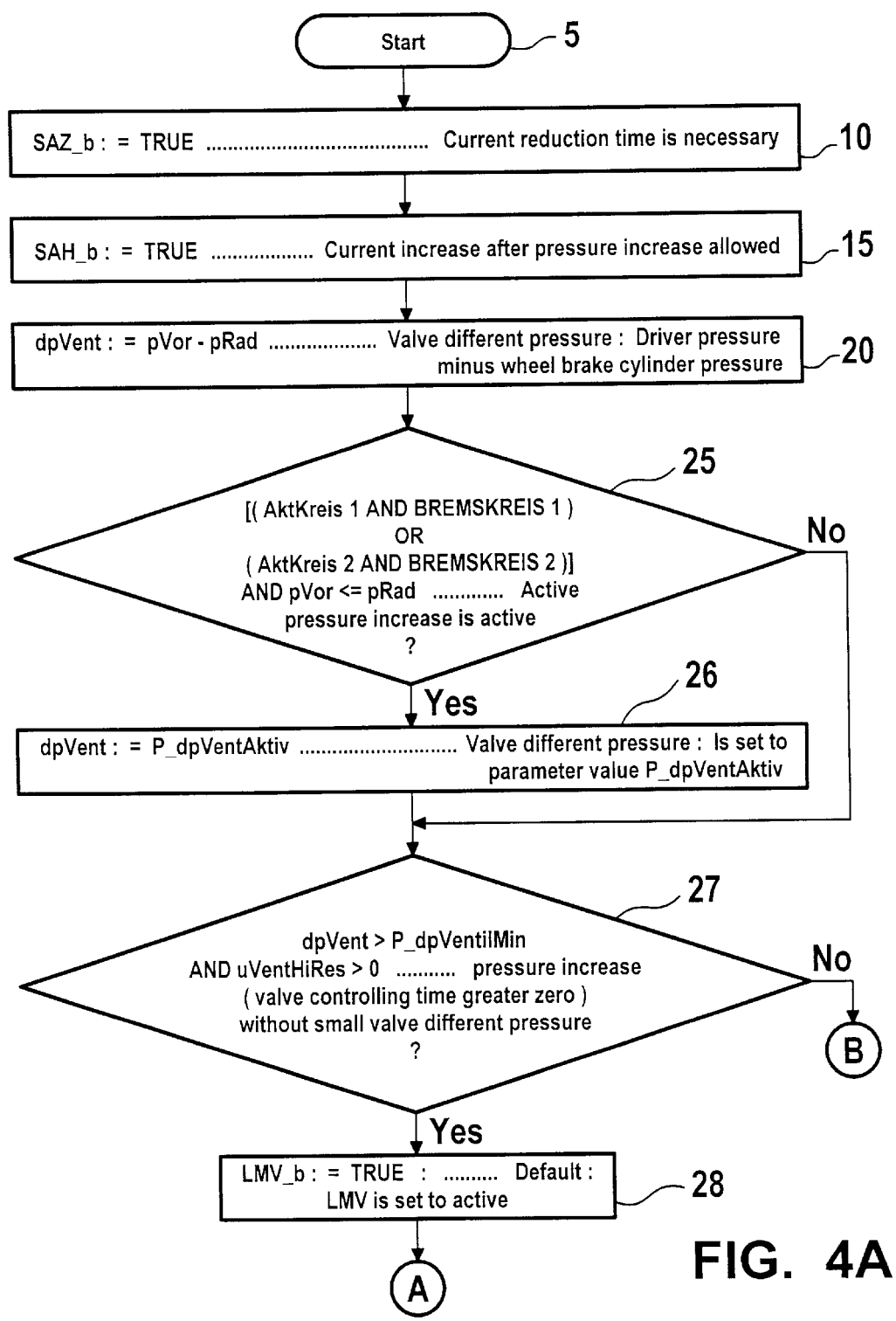

Continuing in step 25 of FIG. 4A, if a first actuator and brake circuit, or a second actuator and brake circuit, and the measured signal for the initial driving pressure (i.e., pVor) is equal to or less than the estimated pressure in the specific wheel brake cylinder to be controlled (i.e., pRad), then in step 26 the variable dpVent is set equal to an assumed pressure difference over the inlet valve with active pressure modulations (i.e., P_dpVentAktiv). This is normally equal to a pressure of 2 bar. Whether pressure increase is active or not as determined in step 25, the calculation of the present invention continues in the next step.

In step 27, if the variable dpVent is greater than the minimum value pressure difference for control (i.e., p_dpVentilMin, normally equal to a pressure of 1 bar), and an input signal of the drive time for the fully opened inlet valve (i.e., uVentHiRes, calculated from the pressure volume characteristic curve pVKen, the square root of the effective pressure difference dpVent, and the desired pressure change in the wheel brake cylinder dpRBZ, as well as a conversion constant) is greater than zero, then in step 28 the variable LMV_b is set equal to TRUE. This indicates whether the LMV-control is active or not. If not, the variable LMV_b is essentially set to FALSE and the calculation continues in step 203 of FIG. 4P which is described in detail further below. In this manner the present invention determines whether a pressure increase is necessary, as if there is a low pressure difference across the valve or the controlling time of the valve (i.e., drive time) is zero, there is no pressure increase and thus no need for LMV-control. Lastly, it is to be understood, of course, that the input signal variable of the drive time for the fully opened inlet valve (i.e., uVentHiRes) is calculated by dividing the desired pressure change in the wheel brake cylinder by the pressure volume characteristic curve again divided by the square root of the effective pressure difference all multiplied by the conversion constant. Further, it is to be understood, of course, that this calculation can also be split up into terms that permit the calculation of volumetric flow equivalents.

Figure 4B:
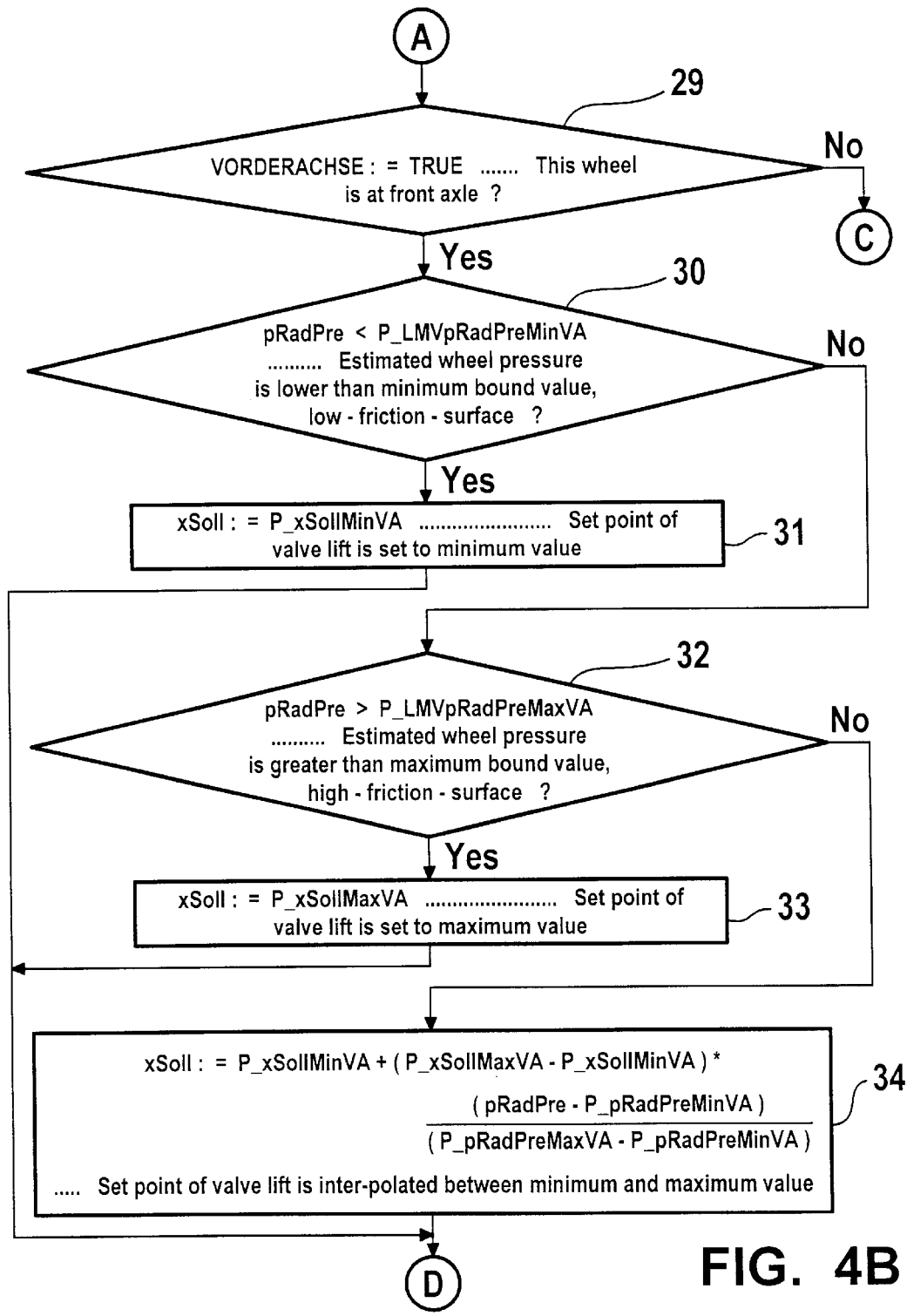

Continuing the calculation in step 29 of FIG. 4B, if the front axle is set equal to TRUE (that is, the wheels of the front axle is the axle to which brake cylinder pressure is to be applied), and then in step 30 if the estimated pressure in the wheel braking cylinder (i.e., pRadPre_sw) is less than a wheel set point pressure threshold value for the inlet valve of the front axle for a valve lift P_xSollMinVA (i.e., P_LMVpRadPreMinVA, normally equal to a pressure of 40 bar), then in step 31 a set point (i.e., xSoll) is set equal to the valve lift for the inlet valve of the front axle for a small wheel brake cylinder set point pressure. For example, the set point valve lift for an inlet valve of a front axle for a small wheel brake cylinder is equal to 0.1. In this case, with a small value of pRadPre_sw, the vehicular wheel is on a low friction surface and thus low noise is desirable. Accordingly, a great LMV-control effect is needed and thus a low desired valve lift is set. However, if the above is not true and in step 32 if the estimated pressure in the wheel braking cylinder (i.e., pRadPre_sw) is greater than the wheel set point pressure threshold value for the inlet valve of the front axle for a valve lift variable xSollMaxVa (i.e., P_LMVpRadPreMaxVA, normally equal to a pressure of 45 bar) then in step 33 the set point (i.e., xSoll) is equal to a set point valve lift for an inlet valve of the front axle for a large wheel brake cylinder set point pressure. For example, this set point value is usually equal to 0.4. This, accordingly, is the alternative case where with a large value of pRadPre_sw, the vehicular wheel is on a high friction surface and thus it is important to have a reliable brake cylinder pressure increase (or the driver may lose control of the car). Accordingly, a low LMV-control effect is needed and thus a high desired valve lift is set. In between the two alternatives of a low and high friction surface a linear interpolation can be installed and thus again, however, if neither of the above is true, in step 34 the set point value (i.e., xSoll) is equal to the set point valve lift for the inlet valve of the front axle of a small wheel brake cylinder plus the sum of the set point valve lift for the inlet valve of the front axle for the large wheel brake cylinder minus the set point valve lift for the inlet valve of a front axle for a small wheel brake cylinder times the variable pRadPre minus the wheel set point pressure threshold value for the inlet valve of the front axle for valve lift, all divided by the wheel set point pressure threshold value for the inlet valve of the front axle for valve lift minus the wheel set point pressure threshold value for inlet valve of the front axle for valve lift.

Figure 4C:
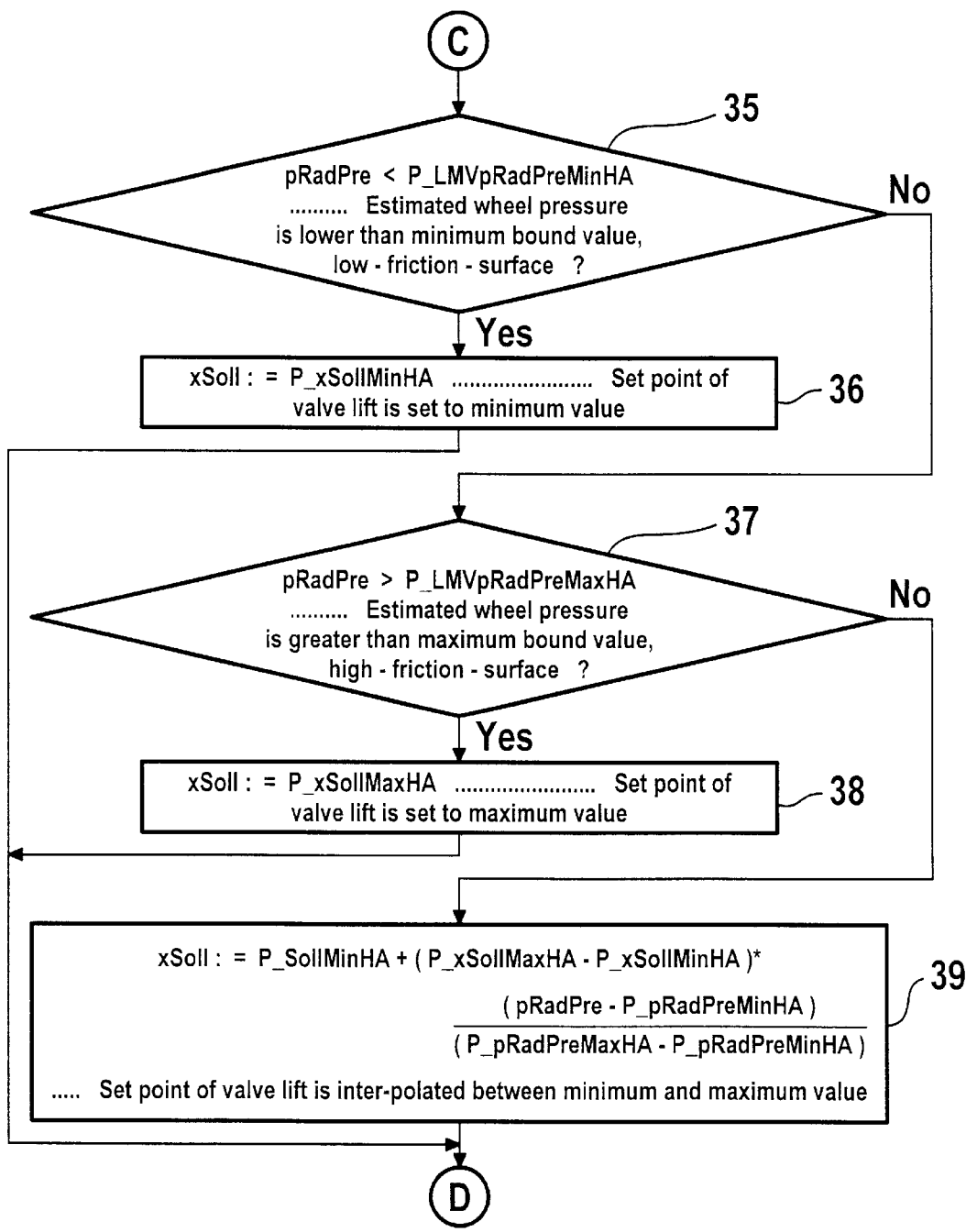

If in step 29 the above is not true in relation to the front axle, then continuing the calculation in step 35 of FIG. 4C if the estimated pressure in the wheel braking cylinder (i.e., pRadPre_sw) is less than the wheel set point pressure threshold value for the inlet valve of the rear axle for valve lift (for example, normally a pressure of 40 bar), then in step 36 the set point value (i.e., xSoll) is equal to the set point valve lift for an inlet valve of the rear axle for a small wheel brake cylinder set point pressure. This is normally, for example, set to 0.1. If, however, the above is not true in respect to step 35 and if in step 37 the estimated pressure in the wheel braking cylinder (i.e., pRadPre_sw) is greater than the wheel set point pressure threshold value for an inlet valve of the rear axle for a valve lift (for example, normally set to a pressure of 45 bar), then in step 38 the set point (i.e., xSoll) is equal to the set point valve lift for an inlet valve of the rear axle for a large wheel brake cylinder set point pressure (for example, normally set to 0.4). Again, however, if the above is not true, then in step 39 the set point is set equal to the set point valve lift for the inlet valve of a rear axle for a small wheel brake cylinder set point pressure plus the sum of the set point valve lift for the inlet valve of the rear axle for a large wheel brake cylinder set point pressure minus that of the set point valve lift for the inlet valve of a rear axle for a small wheel brake cylinder set point pressure times the variable pRadPre minus the wheel set point pressure threshold value for the inlet valve of a rear axle for valve lift, all of which is divided by the wheel set point pressure threshold value for an inlet valve of a rear axle for valve lift minus the wheel set point pressure threshold value for the inlet valve of a rear axle for valve lift. Normally, the wheel set point pressure threshold value for an inlet valve of the rear axle for valve lift of a small wheel brake cylinder set point pressure is set to a pressure of 40 bar, while the wheel set point pressure threshold value for an inlet valve of the rear axle for valve lift of a large wheel brake cylinder set point pressure is set to 45 bar.

Figure 4D:
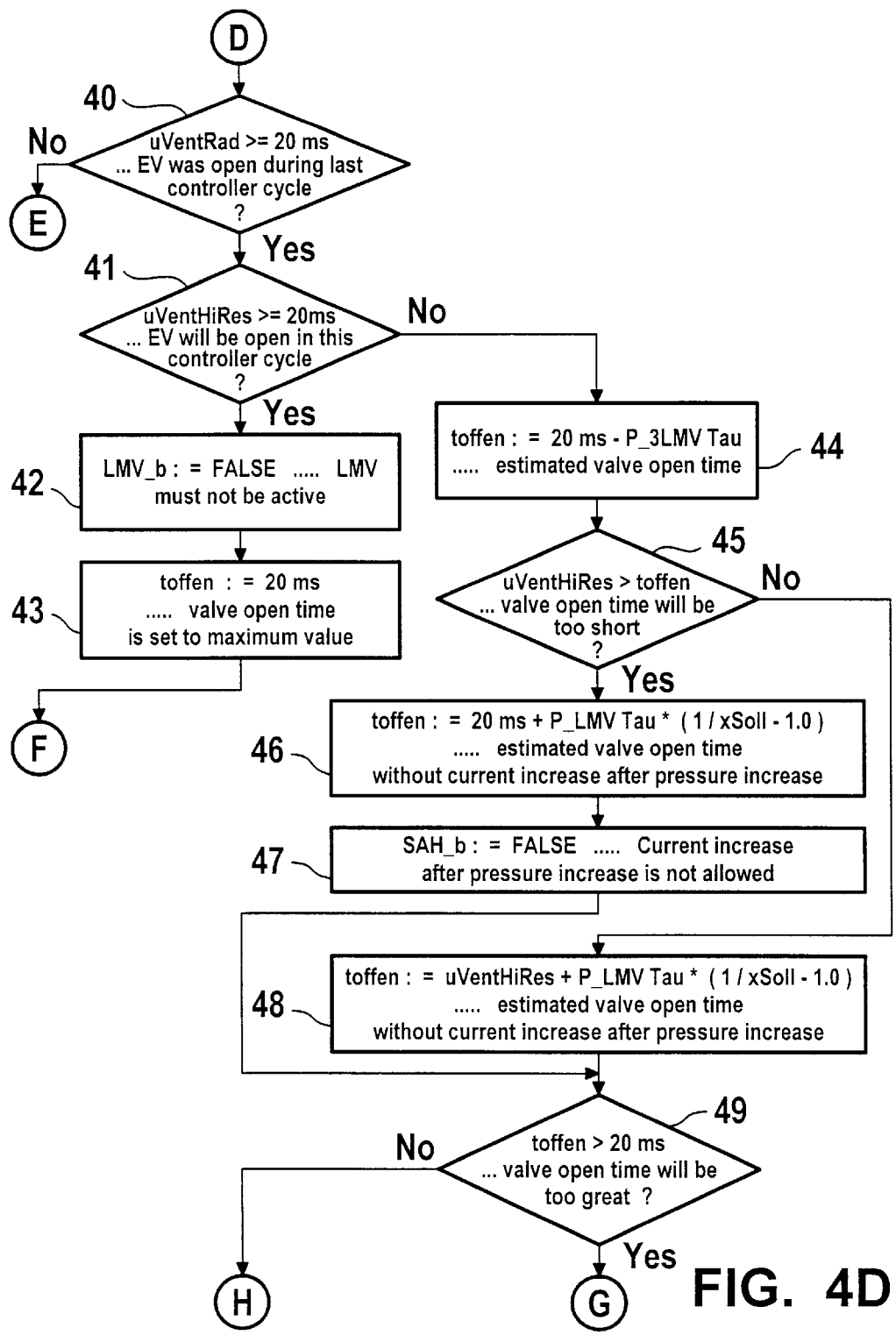

Continuing the calculation (now to determine the valve open time for different cases) in step 40 of FIG. 4D, if the previously used drive time of the slip controller in the computing cycle (i.e., uVentRad) is greater than or equal to 20 milliseconds (i.e., the valve was open at the end of the last controller cycle (as shown in FIG. 3)), and then in step 41 if the calculated drive time for the fully opened inlet valve (i.e., uVentHiRes) is greater than or equal to 20 milliseconds (i.e., the valve is to be open at the end of the controller cycle (as shown in FIG. 2)), then in steps 42 and 43, respectively, the variable LMV_b is set equal to FALSE with the open time (i.e., toffen) equal to 20 milliseconds (i.e., the maximum time value for the controller cycle). In this first case then, LMV-control is not active and the inlet valve should remain without any current signal (as it is to remain open). Further as discussed above, the drive time for the fully opened inlet valve (i.e., uVentHiRes) is calculated from the pressure volume characteristic curve variable pVKen, the square root of the effective pressure difference dpVent and the desired pressure change in the wheel brake cylinder dpRbz, as well as a conversion constant.

Otherwise, in the alternate case from step 41 where the valve is not to remain open at the end of the controller cycle, in step 44 the open time (i.e., toffen) is calculated to be 20 milliseconds minus three times the electromagnetic time constant of the solenoid of the inlet valve (normally 2.35 milliseconds), and in step 45 if the drive time for the fully opened inlet valve (i.e., uVentHiRes) is greater than that calculated open time, then in step 46 the open time is equal to 20 milliseconds plus the electromagnetic time constant of the solenoid of the inlet valve (normally 2.35 milliseconds) times the value 1 divided by the set point value minus 1. Further, in step 47 the value of the bit for the current boost (i.e., SAH_b) is set equal to FALSE (i.e., that is, a current boost is not needed). This is a case in which the valve open time will be too short and there is no current boost after the pressure increase thus allowed.

In the case where neither of the above two decision steps 41 and 45 are true, then in step 48 the open time (i.e., toffen) is set to that of the drive time for the fully opened inlet valve (i.e., uVentHiRes) plus the electromagnetic time constant of the solenoid of the inlet valve (normally 2.35 milliseconds) times the value 1 divided by the set point minus 1. Control of the hydraulics by the brake circuit continues with a resetting of the bit for the current reduction time by continuing in step 49, when if the open time (i.e., toffen) is greater than 20 milliseconds, then in step 50 of FIG. 4E the open time is set to 20 milliseconds, otherwise in step 51 of FIG. 4E if the open time is less than 0 milliseconds the open time is set to zero, or if not, in step 53 the current reduction time (i.e., SAZ_b) is set equal to FALSE (i.e., that is, a current reduction time is not needed).

Figure 4E:
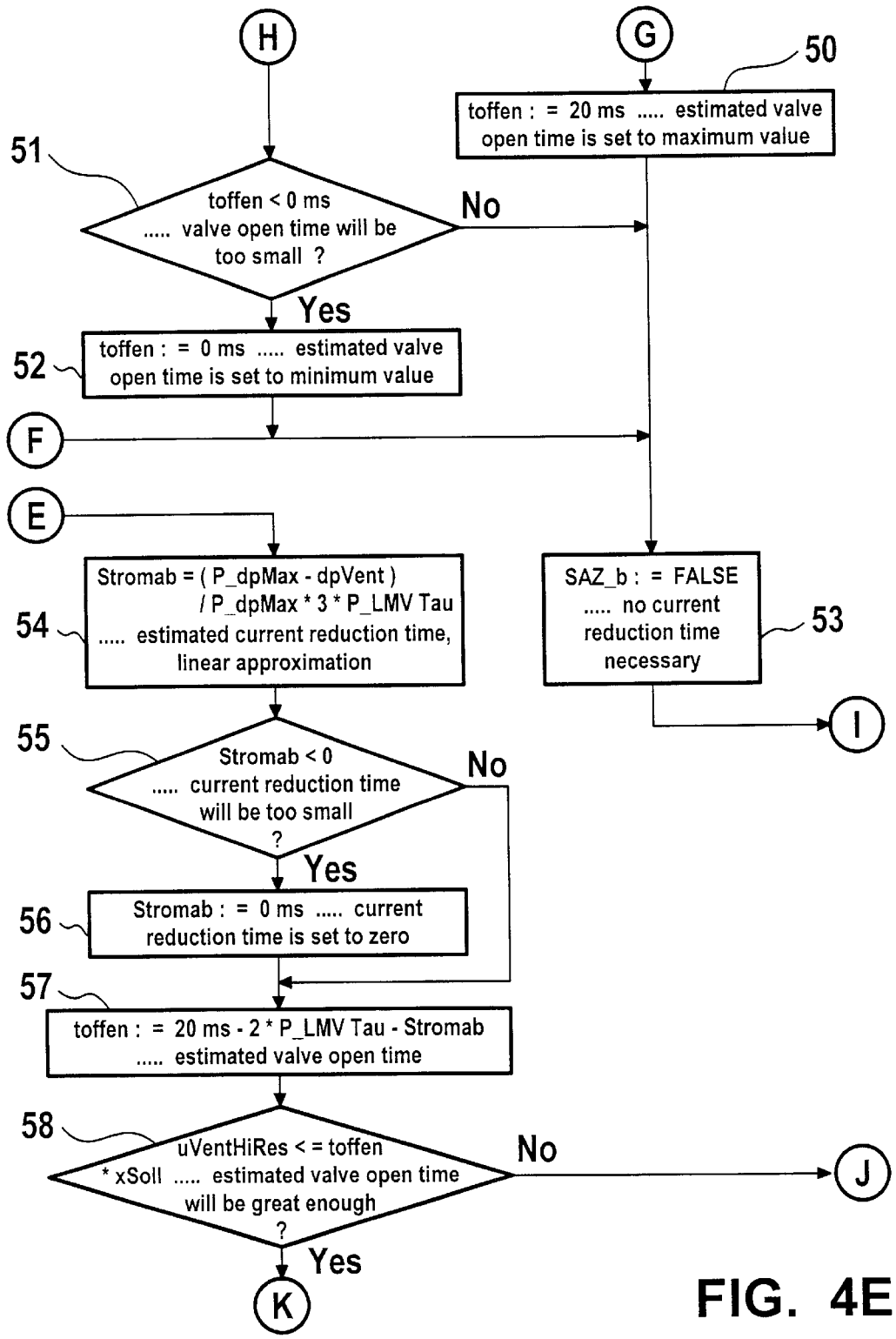
Figure 4F:
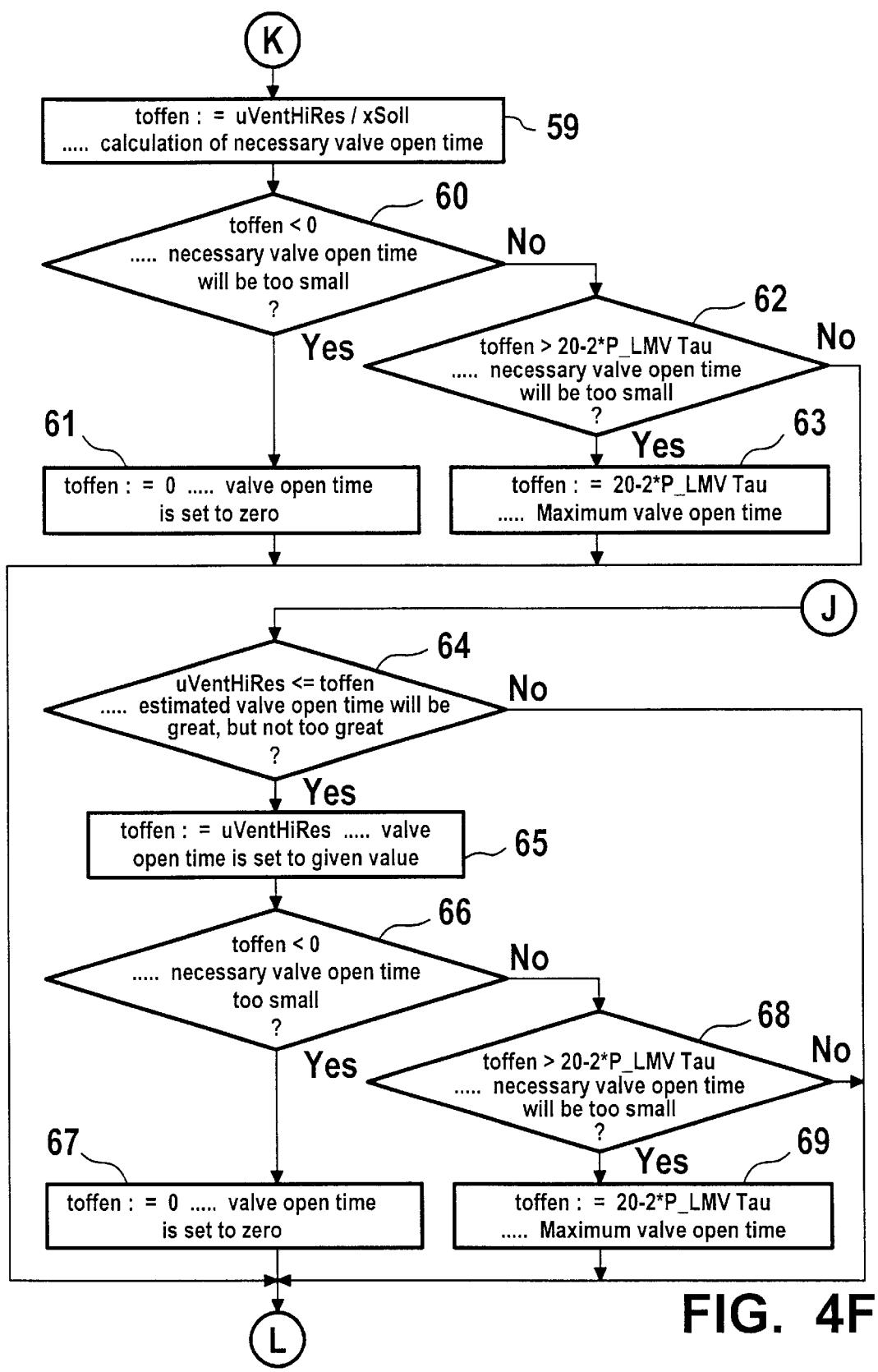

If the above in step 40 is not true (i.e., the valve was not open at the end of the last controller cycle), in step 54 of FIG. 4E, the linear approximated value of the current reduction time (i.e., stromab) is set equal to the sum calculation of the assumed maximum pressure difference across the EV valve (normally a pressure of 200 bar) minus the variable dpVent all divided by the assumed maximum pressure difference across the EV valve (normally a pressure of 200 bar) times 3 times the value of the electromagnetic time constant of the solenoid of the inlet valve. In step 55, if the linear approximated value of the current reduction time is less than 0, then in step 56 the current reduction time is set to zero. In step 57 then, the open time (i.e., toffen) is set to 20 milliseconds minus 2 times the value of the electromagnetic time constant of the solenoid of the inlet valve minus the current reduction. If, in step 58, the set point for the valve lift (i.e., xSoll) is adjustable and the drive time for the fully opened inlet valve (i.e., uVentHiRes) is less than or equal to the open time times the set point value, then in step 59 of FIG. 4F the open time (i.e., toffen) is equal to the drive time for the fully opened inlet valve (i.e., uVentHiRes) divided by the set point. Furthermore, in steps 60, 61, 62 and 63 the open time is limited to between the value of 0 and the value of 20 minus 2 times the electromagnetic time constant of the solenoid of the inlet valve.

In the case in step 58 where the above is not true, in step 64 if the drive time for the fully opened inlet valve (i.e., uVentHiRes) is less than or equal to the open time (i.e., toffen), then in step 65 the system provides the longest possible open time, that is the open time is equal to the drive time for the fully opened inlet valve. Thus, in steps 66, 67, 68 and 69 the open time is limited to the period between the value of 0 and the value of 20 milliseconds minus 2 times the electromagnetic time constant of the solenoid of the inlet valve.

Figure 4G:
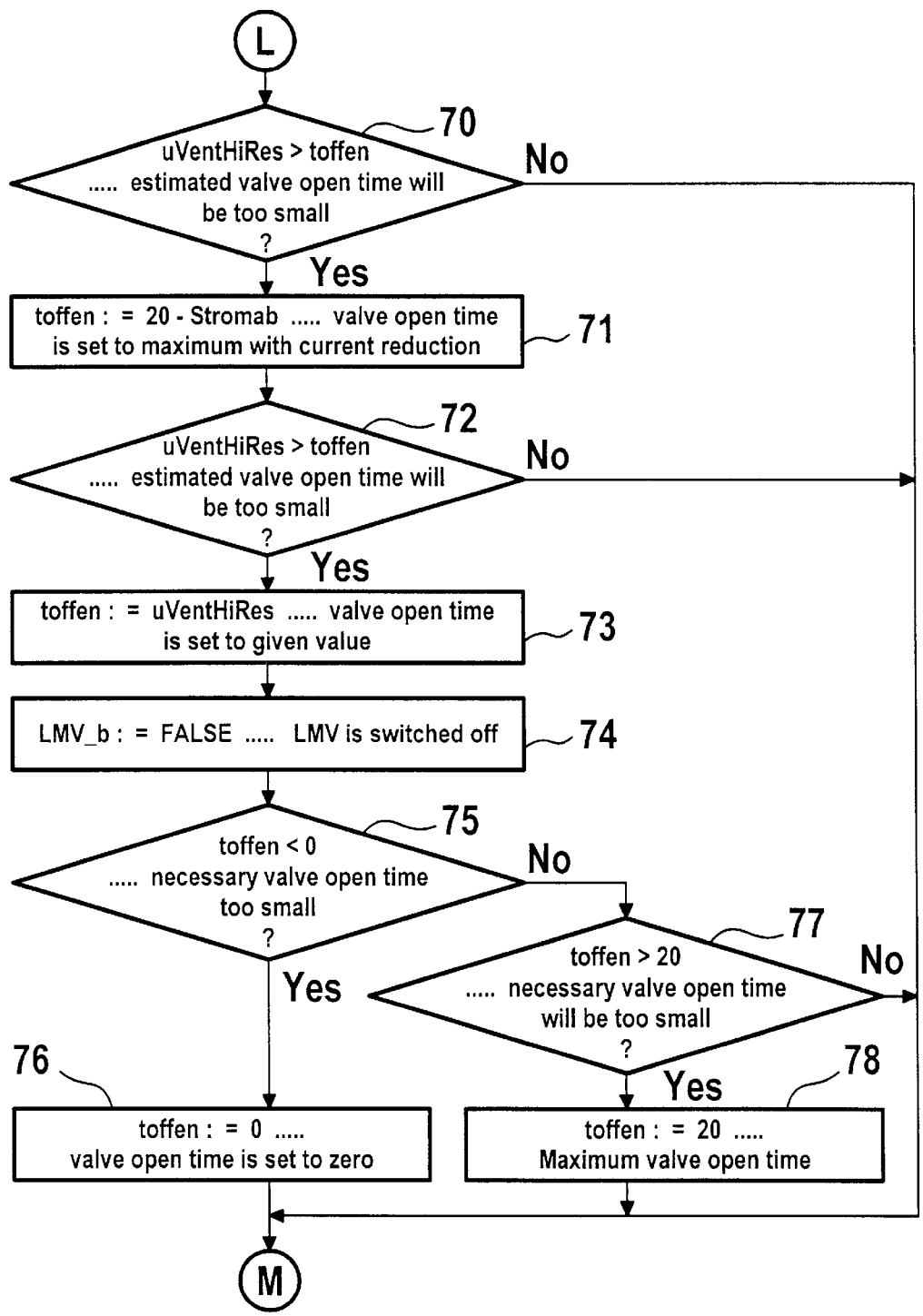

Continuing in step 70 of FIG. 4G, if the drive time for the fully opened inlet valve (i.e., uVentHiRes) is greater than the open time (i.e., toffen), then in step 71 the open time equals 20 milliseconds minus the linear approximated value of the current reduction time (i.e., stromab). Also, in step 72 if the drive time for the fully opened inlet valve (i.e., uVentHiRes) is greater than the open time (i.e., toffen), then in step 73 the open time is set equal to the drive time for the fully opened inlet valve with in step 74 the variable LMV_b being set to FALSE. This is a reset of the bit (i.e., the LMV-control is switched off). In steps 75, 76, 77 and 78 the open time is then limited to a value between 0 to 20 milliseconds.

Figure 4H:
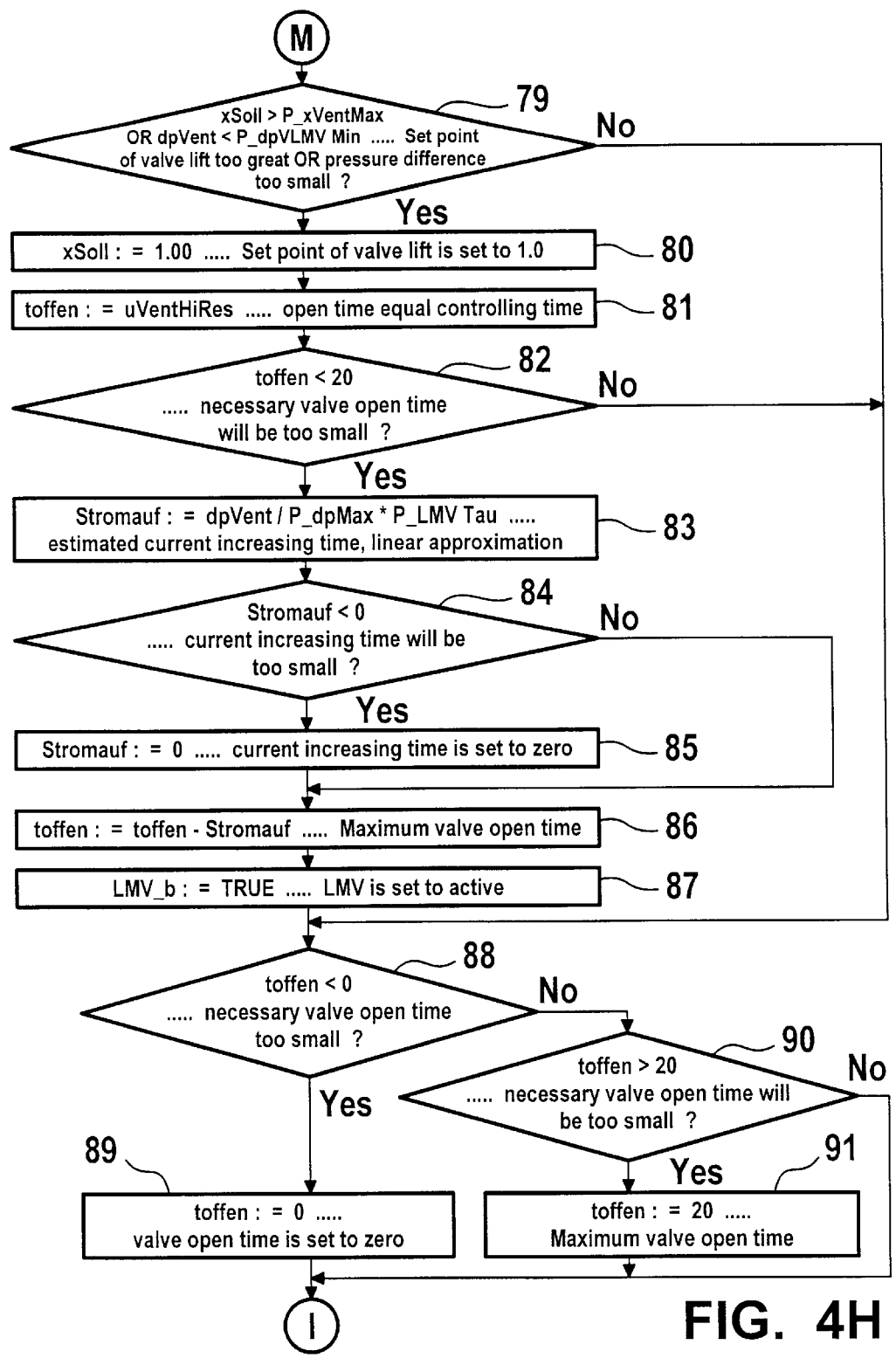

Continuing in step 79 of FIG. 4H, if the set point (i.e., xSoll) is greater than the maximum lift of a LMV_b inlet valve that can be adjusted with stability (normally a value of 0.6), or if the effective pressure difference variable dpVent is less than the minimum differential pressure that must exist to assure LMV inlet valve control (normally a pressure of 25 bar), then in step 80 the set point is set equal to 1 and in step 81 the open time (i.e., toffen) is set equal to the drive time for the fully opened inlet valve (i.e., uVentHiRes). Also, in step 82 if the open time is less than 20 milliseconds, then in step 83 a linear approximation of the current reduction time (i.e., Stromauf) is set equal to the variable dpVent divided by the assumed maximum pressure difference across the EV valve (normally a pressure of 200 bar) times the value of the electromagnetic time constant of the solenoid of the inlet valve. If in step 84 the linear approximation of the current reduction time (i.e., Stromauf) is less than 0 (i.e., indicating that the current reduction time will be too small), then in step 85 it is set to 0. If not, then in step 86 the open time is set equal to the open time minus the current boost and the variable LMV_b is set equal to TRUE. In the case of the above, the open time is then limited in steps 88, 89, 90 and 91 to a value between 0 and 20 milliseconds.

Figure 4I:
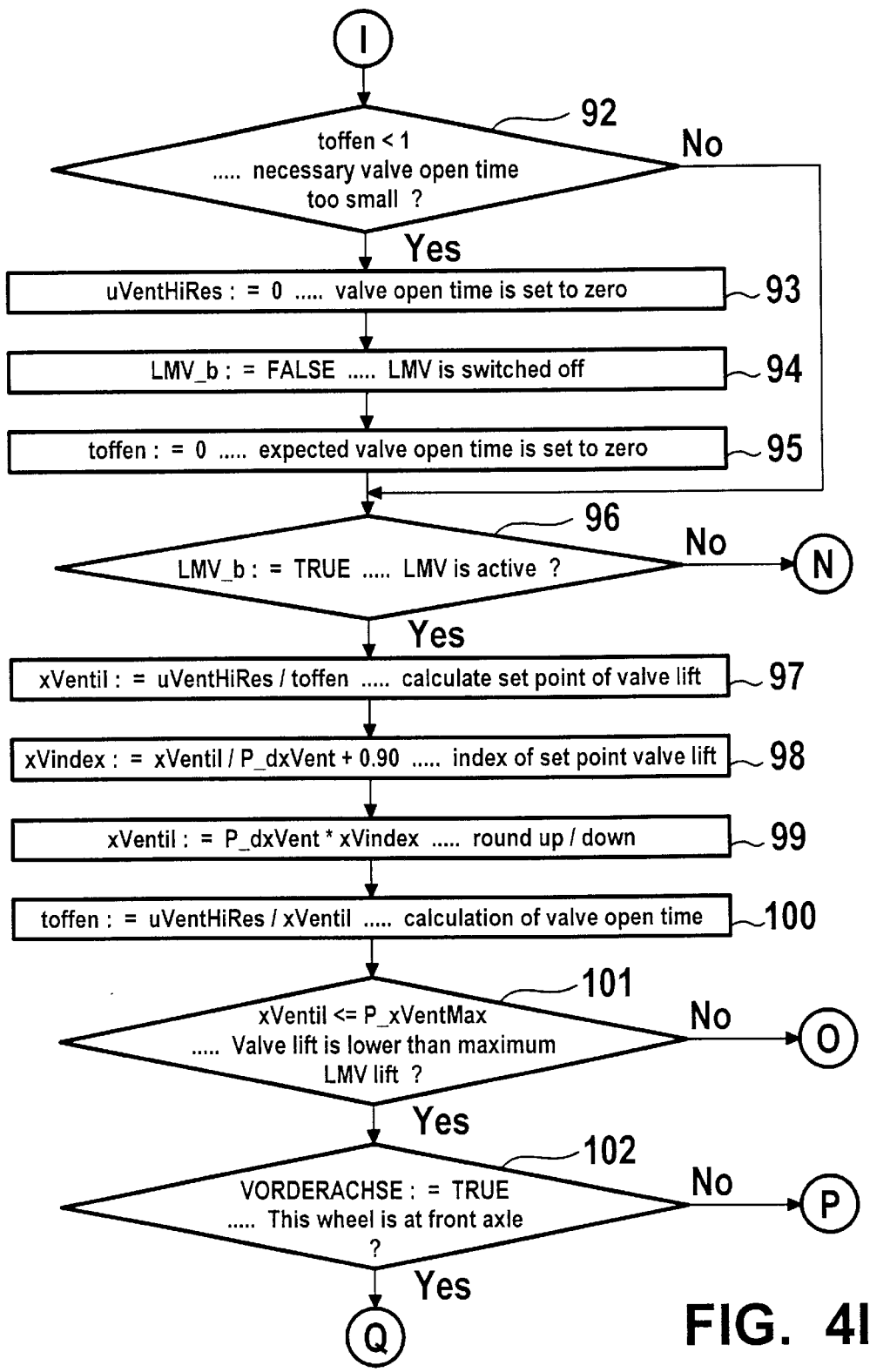

Continuing in step 92 of FIG. 4I, if the open time is less than 1 millisecond, then in steps 93, 94 and 95, respectively, the drive time for the fully opened inlet valve is set equal to 0, the variable LMV_b is set equal to FALSE, the set point is set equal to 0, and the open time itself is set equal to 0. In step 96, if the variable LMV_b is equal to TRUE, then in steps 97, 98 and 99 a calculation of the valve lift that can actually be implemented and a rounding off of that valve lift calculation occur. Calculation of the valve lift is done by dividing the drive time for the fully opened inlet valve by the open time. Rounding off of the valve lift is done by using the implemented increments in valve lift (usually 0.1) multiplied by the valve lift value divided by the implemented increments in valve lift which sum being added to 0.92, while in step 100 the open time is set equal to that of the drive time for the fully opened inlet valve divided by the calculated valve lift variable that can actually be implemented. In step 101, if the valve lift that can actually be implemented is equal to or less than the maximum lift of an LMV-EV valve that can be adjusted with stability (normally 0.6), then in step 102 if the front axle is set equal to TRUE then the calculation continues as described in FIG. 4J, and if not the calculation continues as described in FIG. 4K. If, however, in step 101 the valve lift that can actually be implemented is not equal to or less than the maximum lift of an LMV-EV valve that can be adjusted with stability (normally 0.6), then the calculation continues as described below in step 149 of FIG. 4L.

Figure 4J:
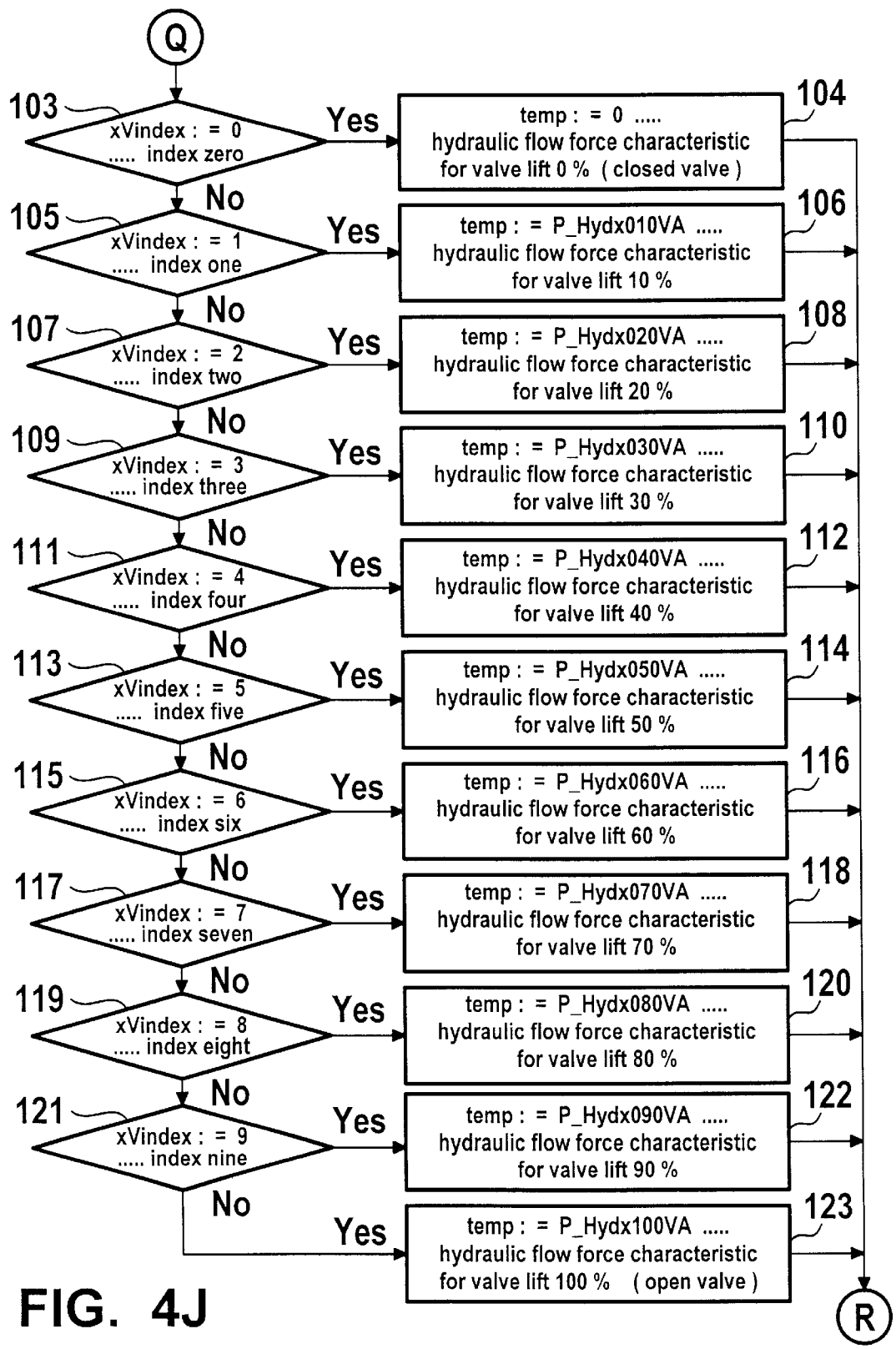
Figure 4K:
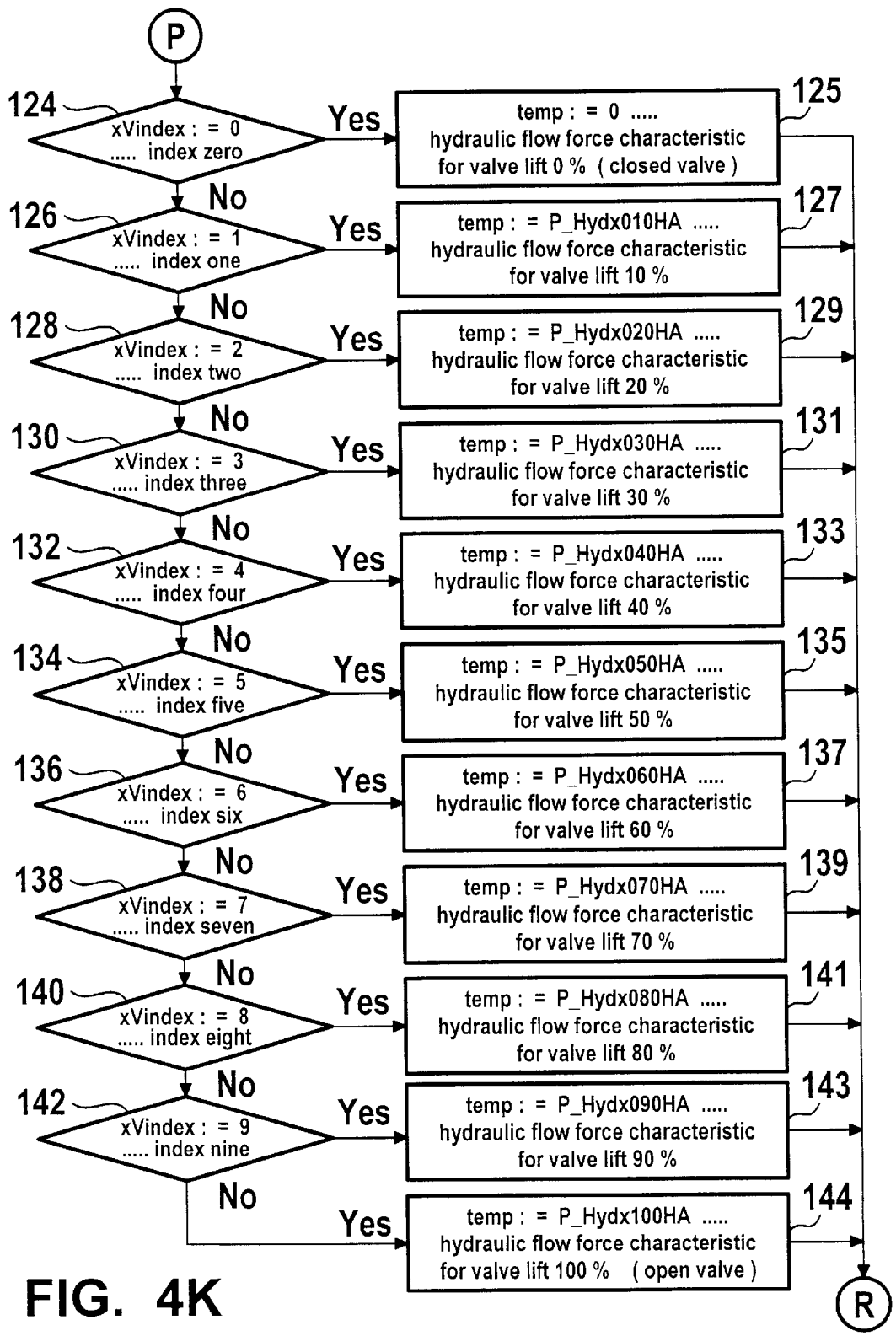

For further control of the hydraulics of the brake circuit the calculation of duty cycles is accomplished in steps 103 through 176 of FIGS. 4J, 4K, 4L and 4M. FIGS. 4J and 4K show the calculation of the non-linear flow force for the front and rear wheel braking cylinders, respectively. Accordingly, the variable xVindex is the index of the set point of the valve lift. As the calculation must be accomplished for every possible set point of the valve lift, the variable xVindex is set to a percentage from zero to 90 (i.e., the variable xVindex is set from equal to 0 to 9 in each corresponding step). Furthermore, the variable temp is a temporary register variable to store the value of the parameter P_Hydx(xVindex), which is then utilized in step 148 of FIG. 4L.

Figure 4L:
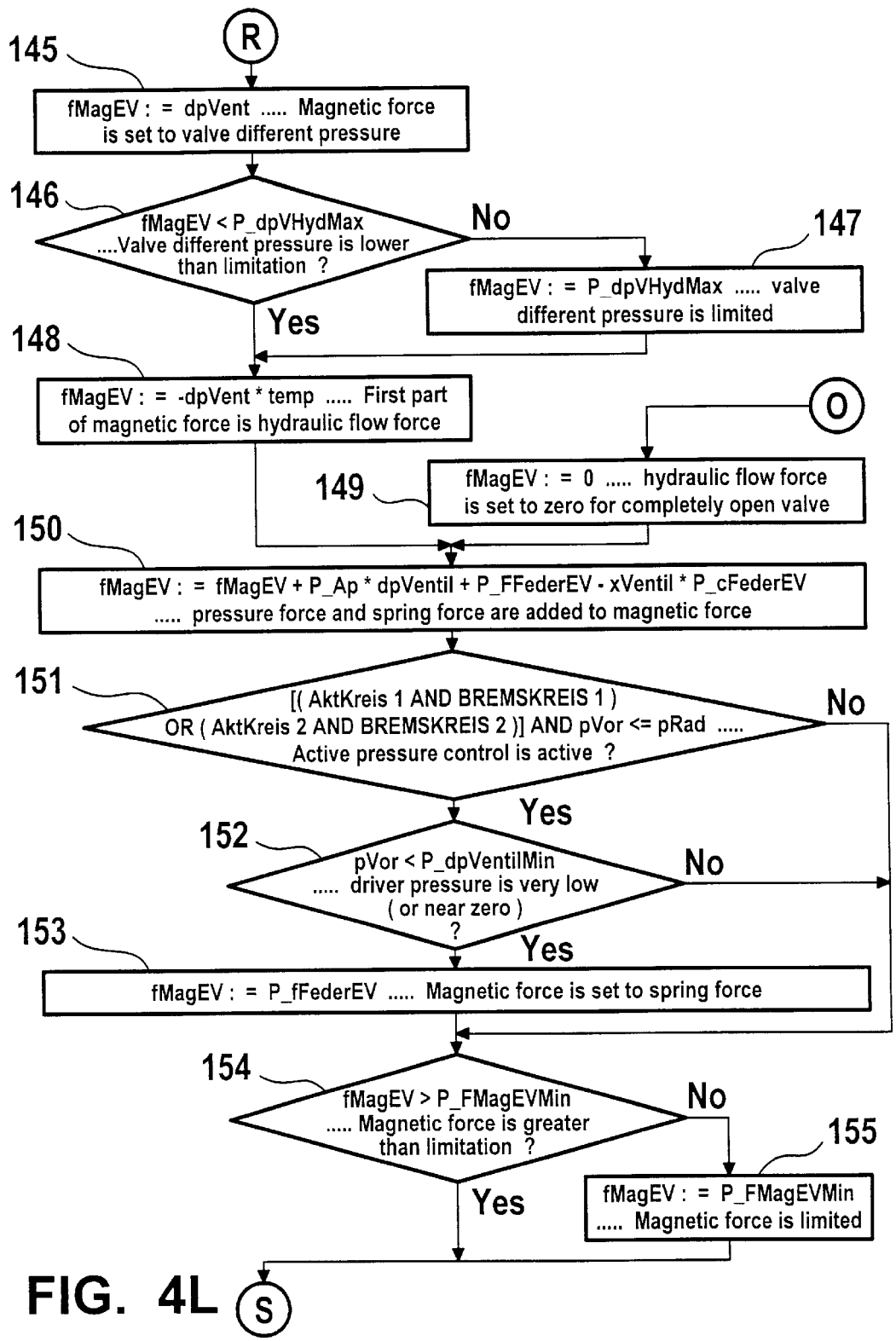
Figure 4M:
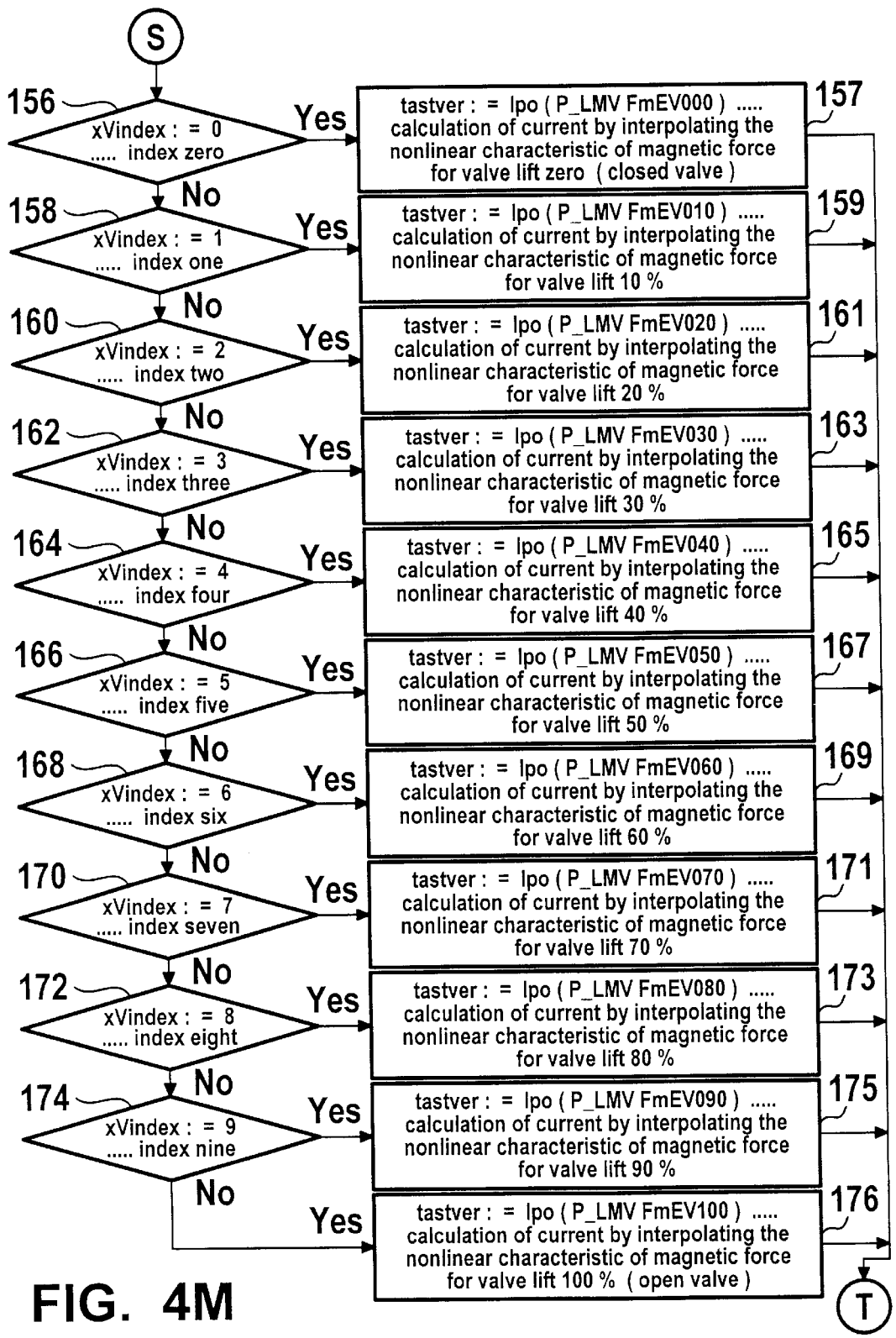
Figure 4N:
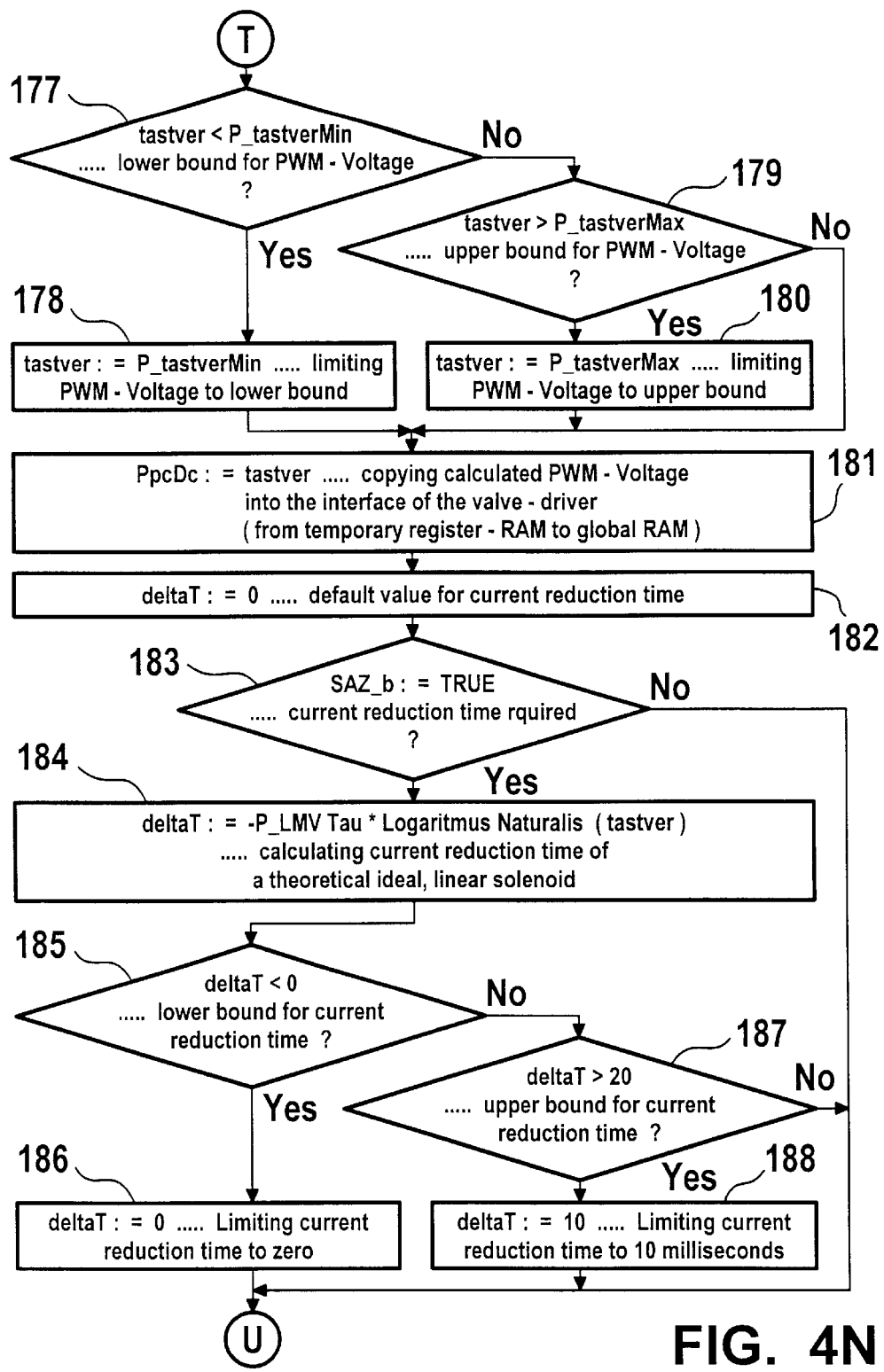
Figure 40:
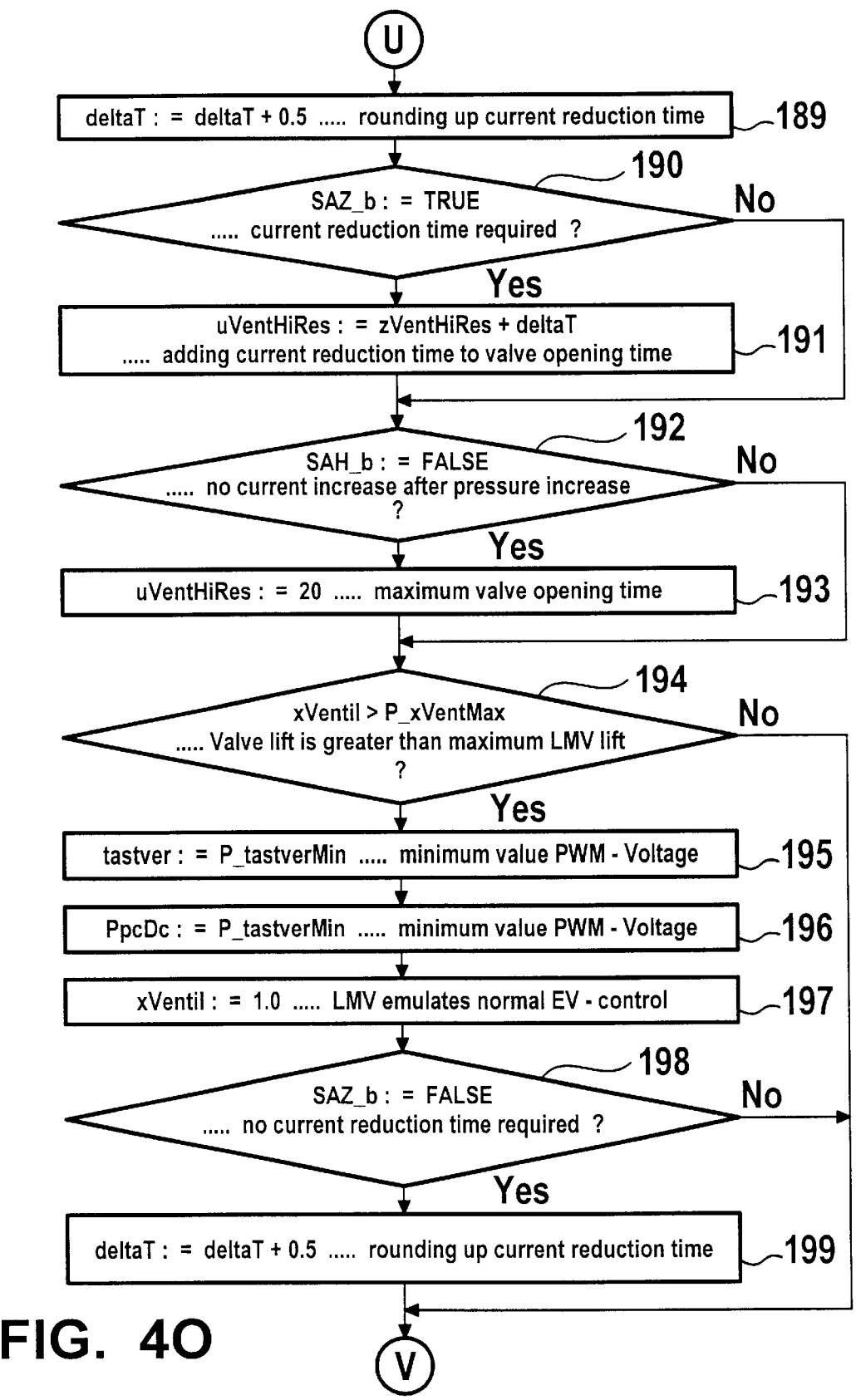

FIGS. 4L and 4M show the calculation of the necessary magnetic force required to compensate the pressure force, hydraulic force and the spring force. This entails calculation of a necessary solenoid force and a calculation of a pulse width modulated current from a two dimensional map. As the magnetic force depends on the current, it is a non-linear characteristic.

Calculation of the necessary solenoid force is for a LMV and an emulated switching valve control. Calculation of the solenoid force for the LMV is accomplished by finding a value for the magnetic (or solenoid) force. Such force is equal to the effective surface of the LMV inlet valve upon which pressure acts (normally equal to 0.554177 mm$^2$) times the variable dpVentil plus the spring pre-tensioning force (normally equal to 1.9 N) minus that spring pre-tensioning force multiplied by the spring constant (normally equal to 1.8 N/mm) times the calculated valve lift minus the characteristic map for flow force estimation (dependent upon the calculated valve lift) times the variable dpVentil.

Calculation of the necessary solenoid force for the emulated switching valve control in which the set point value is equal to 1 is by determining the value for the magnetic (or solenoid) force being equal to the effective surface of the LMV inlet valve upon which pressure acts (normally equal to 0.554177 mm$^2$) times the variable dpVentil plus the spring pretensioning force (normally equal to 1.9 N) minus the spring constant (normally equal to 1.8 N/mm) times the calculated valve lift that can be actually implemented. A limitation of the magnetic force is the minimum of either the magnetic force and/or 0.25 N.

A calculation of the pulse width modulated current from a two dimensional map is determined by the calculated pulse width modulated duty cycle being equal to the electric current through the valve solenoid calculated from (and/or dependent upon) the Magnetic force and the valve displacement. Such output signal as determined in steps 177, 178, 179 and 180, that is the calculated pulse width modulated duty cycle is equal to the limits of adjustable duty cycles. In step 181 then, the calculated pulse width modulated duty cycle during current reduction time (i.e., PpcDc) is equal to the output of the calculated pulse width modulated duty cycle, and in step 182 the calculated duration of a theoretical ideal current reduction time (i.e., deltaT) is equal to 0.

In step 183, if the bit for the current reduction time (i.e., SAZ_b) is set equal to TRUE (i.e., that is, a current reduction time is needed), then in step 184 the calculated duration of the theoretical ideal current reduction time (i.e., deltaT) is equal to a negative electromagnetic time constant of the solenoid of the EV valve (normally equal to 2.35 milliseconds) times the natural logarithm of the calculated pulse width modulated duty cycle. In steps 185, 186, 187 and 188 the calculated duration of the current reduction time is limited to between a value of 0 and 10 milliseconds.

Continuing with the calculation in FIG. 4O, adaptive normalization of the calculated duration of the current reduction time then occurs in step 189, where an incorporation of the rounding of the drive time for the fully opened inlet valve in the calculated duration of the current reduction time occurs and the calculated duration of the theoretical ideal current reduction time is rounded up by adding 0.5. Such rounding up is necessary as the controller is a standard ESP-controller which has only an integer calculation for every step and thus has a possible inexactness which could lead to a great divergence between the estimated and measured pressure.

Continuing in step 190, if the bit for the current reduction time (i.e., SAZ_b) is set equal to TRUE (i.e., that is, a current reduction time is needed), then in step 191 the drive time for the fully opened inlet valve (i.e., uVentHiRes) is set equal to the drive time for the fully opened inlet valve plus the calculated duration of the current reduction time (i.e, thus adding the current reduction time to the valve opening time). If, however, in step 192 the value of the bit set for the current boost (i.e., SAH_b) is equal to FALSE (i.e., that is, a current boost is not needed), then in step 193 the drive time for the fully open inlet valve (i.e., uVentHiRes) is equal to 20 milliseconds.

In step 194, if the valve lift (i.e., xVentil) is greater than the maximum lift of the LMV inlet valve that can be adjusted with stability (usually 0.6), then in step 195 the calculated pulse width modulated duty cycle is set equal to the lower limit of the adjustable duty cycle (1%), in step 196 the calculated pulse width modulated duty cycle during current reduction time (i.e., PpcDc) is set equal to the lower limit of the adjustable duty cycle (1%), and in step 197 the valve is set equal to 1 so that the LMV-control emulates normal EV-control. Also, in step 198 if the value of the bit for the current reduction time (i.e., SAZ_b) is set equal to FALSE (i.e., that is, a current reduction time is not needed), then in step 199 an incorporation of the rounding of the drive time for the fully opened inlet valve in the calculated duration of the current reduction time occurs and such calculated duration of the current reduction time is equal to the calculated duration of the current reduction time plus 0.5.

Figure 4P:
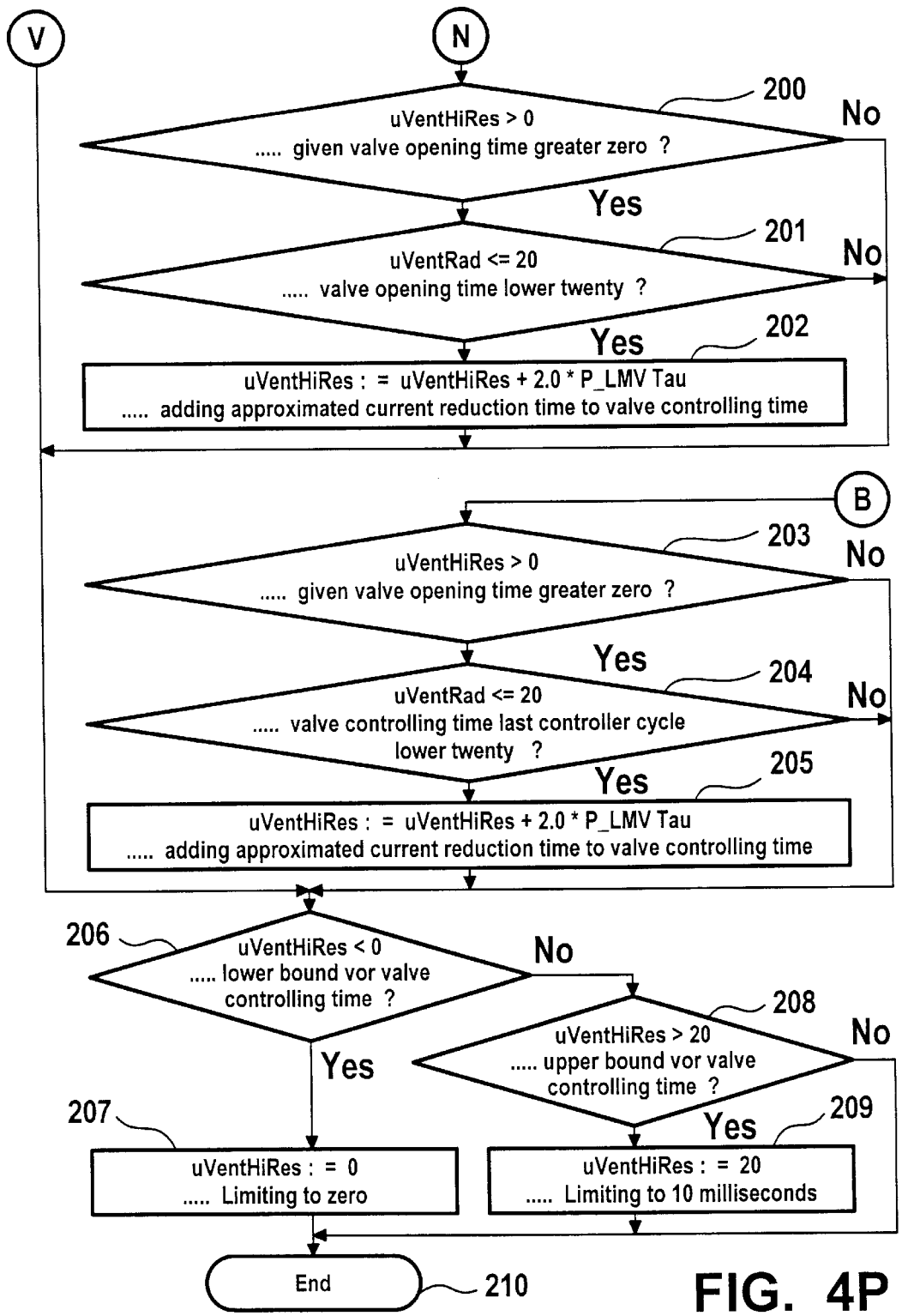

Returning to step 96 of FIG. 4I, if the variable LMV_b is not set to TRUE (i.e., that is, the LMV-control is not active), and, moving to step 200 of FIG. 4P, if the drive time for the fully open inlet valve is greater than 0, then in step 201 if the previously used drive time of the slip controller in the computing cycle is less than or equal to 20 milliseconds, then in step 202 the drive time for the fully opened inlet valve is equal to the drive time for the fully opened inlet valve plus 2.0 times the electromagnetic time constant of the solenoid of the inlet valve (normally equal to 2.35 milliseconds).

Returning now to step 27 of FIG. 4A, if not true, and, moving to step 203 of FIG. 4P, if the drive time for the fully opened inlet valve is greater than 0, then in step 204 if the previously used drive time of the slip controller in the computing cycle is less than or equal to 20 milliseconds, then in step 205 the drive time for the fully opened inlet valve is equal to the drive time for the fully opened inlet valve plus 2.0 times the electromagnetic time constant of the solenoid of the inlet valve (normally equal to 2.35 milliseconds).

In steps 206, 207, 208 and 209 the drive time for the fully opened inlet valve is limited to a value being greater than or equal to 0 but less than or equal to 20 milliseconds. In step 210 the process ends.

A grouping of the current reduction values is accomplished by taking the value of the assumed maximum pressure difference across the inlet valve (normally equal to a pressure of 200 bar) minus the variable dpVent divided by the assumed maximum pressure difference across the inlet valve times 3.0 times the electromagnetic time constant of the solenoid of the inlet valve (normally equal to 2.35 milliseconds). The current reduction time is limited only to the fact that the current reduction must be a value greater than or equal to 0.

The current boost group value is calculated in the elictromagnetic time constant of the solenoid of the inlet valve (normally 2.35 milliseconds) times the variable dpVent divided by the assumed maximum pressure difference across the inlet valve (normally equal to a pressure of 200 bar). The current boost group value is limited only in that it must be a value greater than or equal to the value of 0.

Referring now to FIG. 5, a schematic of a braking control circuit, according to an embodiment of the present invention, is illustrated. Braking control circuit 1 is coupled to a solenoid valve 2. As shown above, braking control circuit 1 controls actuation of valve 2, which thereby also controls pressure in a pump (not shown).

Thus, as can be seen from the above, by using read-in wheel speeds, the method and apparatus of the present invention is capable of doing actuation control without a fast correction. Consequently, no feedback effects are to be expected on the overlaid control structures. Hence, the present invention is easy to apply. Further, the structure of the calculation has been chosen such that one parameter can be used to vary the necessary compromise between noise generation and controller robustness. This makes it possible to implement customer desires with regard to noise reduction in a way that is easy to comprehend.

In the foregoing description, the method and apparatus of the present invention have been described with reference to a number of examples that are not to be considered limiting. Rather, it is to be understood and expected that variations in the principles of the method and apparatus herein disclosed may be made by one skilled in the art and it is intended that such modifications, changes, and/or substitutions are to be included within the scope of the present invention as set forth in the appended claims. The specification and the drawings are accordingly to be regarded in an illustrative rather than in a restrictive sense.

What is claimed is:

1. A method of actuation control in a hydraulic sub-system of a braking system in order to reduce noise associated with the hydraulics, the method comprising the steps of:
    determining whether a controlled brake cylinder pressure increase of a wheel is necessary;
    setting a valve lift set point to accommodate the necessary brake cylinder pressure increase;
    determining a valve open time to accommodate the necessary brake cylinder pressure increase;
    determining a duration of a current reduction time necessary before the valve open time; and
    determining a current needed to drive the valve lift set point and control the valve open time.

2. The method according to claim 1, further comprising the steps of: determining if the current reduction time is necessary and determining if a current increase is allowed after the controlled brake cylinder pressure increase.

3. The method according to claim 1 or 2, further comprising the step of determining to which axle the controlled brake cylinder pressure increase is to be applied.

4. The method according to claim 1, 2 or 3, further comprising the step of determining a friction surface the wheel is on.

5. The method according to claim 1, 2, 3 or 4, wherein the valve lift set point is based upon a friction surface the wheel is on.

6. The method according to claim 1, 2, 3, 4 or 5, further comprising the step of determining a theoretical ideal current reduction time.

7. The method according to claim 1, 2, 3, 4, 5 or 6, further comprising the step of normalizing the duration of a current reduction time.

8. The method according to claim 1, 2, 3, 4, 5, 6 or 7, wherein the step of determining a duration of a current reduction time is by linear approximation.

9. The method according to claim 1, 2, 3, 4, 5, 6, 7 or 8, wherein the step of determining current needed to drive the valve lift set point and the valve open time is by interpolating a nonlinear characteristic of magnetic force for the valve lift.

10. The method according to claim 1, 2, 3, 4, 5, 6, 7, 8 or 9, further comprising the step of determining a hydraulic flow force characteristic for the valve lift set point.

11. The method according to claim 1, 2, 3, 4, 5, 6, 7, 8, 9 or 10, wherein the valve open time is equal to a current control time.

12. A method of actuation control in a hydraulic sub-system of a braking system in order to reduce noise associated with the hydraulics, the method comprising the steps of:
    determining a current reduction time necessary to allow control of a valve opening time;
    determining a pulse-width modulated current signal level to control the valve opening time;
    determining whether a current increase is possible after a desired pressure increase is obtained by the valve opening time; and
    controlling the valve opening time to accomplish the desired pressure increase.

13. The method according to claim 12, further comprising the steps of determining if the current reduction time is needed and determining if the current increase is allowed after the desired pressure increase is obtained.

14. The method according to claim 12 or 13, further comprising the step of determining to which axle the desired pressure increase is to be applied.

15. The method according to claim 12, 13 or 14, further comprising the step of determining a friction surface a wheel of an axle is on.

16. The method according to claim 12, 13, 14 or 15, further comprising the step of determining a valve lift set point necessary to accomplish the desired pressure increase.

17. The method according to claim 16, wherein the step of determining the valve lift set point is based upon a friction surface the wheel is on.

18. The method according to claim 12, 13, 14, 15, 16 or 17, further comprising the step of determining a theoretical ideal current reduction time.

19. The method according to claim 12, 13, 14, 15, 16, 17 or 18, further comprising the step of normalizing the current reduction time necessary.

20. The method according to claim 12, 13, 14, 15, 16, 17, 18 or 19, wherein the step of determining the current reduction time necessary is by linear approximation.

21. The method according to claim 12, 13, 14, 15, 16, 17, 18, 19 or 20, wherein the step of determining a pulse-width modulated current signal level needed to control the valve open time is accomplished by interpolating a nonlinear characteristic of magnetic force for a valve lift set point.

22. The method according to claim 12, 13, 14, 15, 16, 17, 18, 19, 20 or 21, further comprising the step of determining a hydraulic flow force characteristic for a valve lift set point.

23. The method according to claim 12, 13, 14, 15, 16, 17, 18, 19, 20, 21 or 22, wherein the valve opening time is equal to a controller cycle.

24. An apparatus for controlling actuation in a hydraulic sub-system of a braking system in order to reduce noise associated with the hydraulics, the apparatus comprising:
   a solenoid valve which controls a pressure increase in a pump of the braking system; and
   a braking circuit which controls a current which drives the solenoid valve on a basis of at least one of:
      a determination of a current reduction time necessary to allow the driving of the solenoid valve;
      a determination of a signal level of the current necessary to allow the driving of the solenoid valve; and
      a determination of the driving time of the solenoid valve necessary to control the pressure increase.

25. The apparatus according to claim 24, wherein a part of the basis is a determination of a valve lift set point necessary to drive the solenoid valve.

26. The apparatus according to claim 24 or 25, wherein a part of the basis is at least one of:
   a determination of whether the current reduction time is necessary; and
   a determination of whether a current increase is allowed after the solenoid valve controls the pressure increase.

* * * * *

UNITED STATES PATENT AND TRADEMARK OFFICE
CERTIFICATE OF CORRECTION

PATENT NO. : 6,511,137 B2  Page 1 of 1
DATED : January 28, 2003
INVENTOR(S) : Manfred Gerdes It is certified that error appears in the above-identified patent and that said Letters Patent is hereby corrected as shown below:

Column 10,
Line 19, delete "or 2".
Line 22, delete "2 or 3,".
Line 25, delete "2, 3 or 4,".
Line 27, delete "2, 3, 4, or 5,".
Line 31, delete "2, 3, 4, 5 or 6,".
Line 34, delete "2, 3, 4, 5, 6 or 7,".
Line 37, delete "2, 3, 4, 5, 6, 7 or 8,".
Line 43, delete "2, 3, 4, 5, 6, 7, 8 or 9,".
Line 45, delete "2, 3, 4, 5, 6, 7, 8, 9 or 10,".
Line 65, delete "or 13".

Column 11,
Line 1, delete "13 or 14,".
Line 4, delete "13, 14, or 15,".
Line 10, delete "13, 14, 15, 16, or 17,".
Line 13, delete "13, 14, 15, 16, 17 or 18,".
Line 16, delete "13, 14, 15, 16, 17, 18 or 19,".
Line 19, delete "13, 14, 15, 16, 17, 18, 19 or 20".
Line 24, delete "13, 14, 15, 16, 17, 18, 19, 20 or 21,".

Column 12,
Line 1, delete "13, 14, 15, 16, 17, 18, 19, 20, 21 or 22,".
Line 19, delete "or 25,".

Signed and Sealed this

Tenth Day of February, 2004

JON W. DUDAS
*Acting Director of the United States Patent and Trademark Office*